(12) United States Patent
Akagi et al.

(10) Patent No.: US 9,496,805 B2
(45) Date of Patent: Nov. 15, 2016

(54) SINGLE-PHASE POWER CONVERTER, THREE-PHASE TWO-PHASE POWER CONVERTER, AND THREE-PHASE POWER CONVERTER

(71) Applicant: Tokyo Institute of Technology, Meguro-ku, Tokyo (JP)

(72) Inventors: Hirofumi Akagi, Tokyo (JP); Makoto Hagiwara, Tokyo (JP)

(73) Assignee: TOKYO INSTITUTE OF TECHNOLOGY, Tokyo (JP)

( * ) Notice: Subject to any disclaimer, the term of this patent is extended or adjusted under 35 U.S.C. 154(b) by 358 days.

(21) Appl. No.: 14/360,251

(22) PCT Filed: Nov. 15, 2012

(86) PCT No.: PCT/JP2012/079668
§ 371 (c)(1),
(2) Date: May 22, 2014

(87) PCT Pub. No.: WO2013/077250
PCT Pub. Date: May 30, 2013

(65) Prior Publication Data
US 2014/0355321 A1  Dec. 4, 2014

(30) Foreign Application Priority Data

Nov. 25, 2011  (JP) ................................. 2011-257866

(51) Int. Cl.
*H02M 7/483* (2007.01)
*H02M 7/797* (2006.01)
(Continued)

(52) U.S. Cl.
CPC ............. *H02M 7/797* (2013.01); *H02M 7/483* (2013.01); *H02M 7/497* (2013.01); *H02M 7/537* (2013.01);
(Continued)

(58) Field of Classification Search
CPC ............ H02M 2001/0003; H02M 7/49; H02M 7/483; H02M 7/497; H02M 7/537;
(Continued)

(56) References Cited

U.S. PATENT DOCUMENTS 5,450,305 A * 9/1995 Boys .......................... G05F 1/13
219/624
8,547,718 B2 * 10/2013 Katoh ................... H02M 1/088
363/131

(Continued)

FOREIGN PATENT DOCUMENTS

DE  102004052454 A1  5/2006
EP  2 485 384 A1  8/2012

(Continued)

OTHER PUBLICATIONS

Akagi, Hirofumi et al., Classification and Terminology of the Modular Multilevel Cascade Converter (MMCC) *Annual Meeting of the Institute of Electrical Engineers of Japan* (Mar. 2010) No. 4-043:71-72 (Japanese).

(Continued)

*Primary Examiner* — Timothy J Dole
*Assistant Examiner* — Shahzeb K Ahmad
(74) *Attorney, Agent, or Firm* — Kilpatrick Townsend & Stockton LLP

(57) ABSTRACT

This power converter (1) is provided with: unit cells (11-M) having a semiconductor switch, a DC capacitor (C) and a charge/discharge current I/O terminal; a first arm (12-P) and a second arm (12-N) comprising multiple unit cells (11-M) connected to each other in cascade; an arm connecting unit (13) which has a first terminal to which the first arm (12-P) is connected, a second terminal to which the second arm (12-N) is connected, and a third terminal to which a DC power source is connected; and a transformer (14) which has (Continued)

an AC I/O terminal on the primary side and an intermediate terminal on the secondary side winding, and in which the terminal of the first arm (12-P) and the terminal of the second arm (12-N) are connected to the two end terminals on the secondary winding, and the DC power source (Vdc) is connected to the intermediate terminal.

18 Claims, 23 Drawing Sheets

(51) Int. Cl.
  *H02M 7/497*  (2007.01)
  *H02M 7/537*  (2006.01)
  *H02M 7/538*  (2007.01)
(52) U.S. Cl.
  CPC . *H02M 7/53803* (2013.01); *H02M 2007/4835* (2013.01)
(58) Field of Classification Search
  CPC .............. H02M 7/53803; H02M 7/797; H02M 2007/4835; H02M 1/084; H02M 5/40; H02M 5/42; H02M 5/45
  See application file for complete search history.

(56) References Cited

U.S. PATENT DOCUMENTS

| | | | | |
|---|---|---|---|---|
| 8,614,525 | B2 * | 12/2013 | Teichmann | H02J 3/26 307/64 |
| 8,792,261 | B2 * | 7/2014 | Inoue | H02M 7/217 363/129 |
| 8,861,231 | B2 * | 10/2014 | Cross | H02J 3/36 323/207 |
| 8,879,291 | B2 * | 11/2014 | Trainer | H02M 7/49 363/127 |
| 2012/0112545 | A1 * | 5/2012 | Aiello | H02M 7/49 307/65 |

FOREIGN PATENT DOCUMENTS

| | | |
|---|---|---|
| JP | 2010-511876 A | 4/2010 |
| JP | 2011-24392 A | 2/2011 |
| JP | 2011-78213 A | 4/2011 |
| JP | 2011-182517 | 9/2011 |
| WO | 2010/069401 A1 | 6/2010 |
| WO | 2011/040057 A1 | 4/2011 |

OTHER PUBLICATIONS

Hagiwara, Makoto et al., "PWM Control and Experiment of Modular Multilevel Converters," *The transactions of the Institute of Electrical Engineers of Japan. D. Publication of Industry Applications Society* (Jul. 2008) 128(7):957-965 (Japanese).

Hagiwara, Makoto et al., "General Analysis and Control of a Modular Multilevel Cascade Converter (MMCC-DSCC)," *Annual Meeting of the Institute of Electrical Engineers of Japan* (Mar. 2010), No. 4-044:73-74. (Japanese).

Nishimura, Kazutoshi et al., "Applications of a Modular Multilevel Converter to Medium-Voltage Motor Drives: Experimental Verification by a 400-V, 15-kW Laboratory System," *The Papers of Technical Meeting on Semiconductor Power Converter, IEE Japan*, (Jan. 2009), SPC-09-24:19-24. (Japanese).

Hagiwara, Makoto et al. "PWM Control and Experiment of Modular Multilevel Converters," *Power Electronics Specialist Conference*, Power Electronics Specialist Conference (date of conference Jun. 15-19, 2008); IEEE Piscataway, New Jersey, U.S.A.; pp. 154-161.

English translation of International Search Report corresponding to PCT/JP2012/079668 mailed Feb. 19, 2013, 1 page.

\* cited by examiner

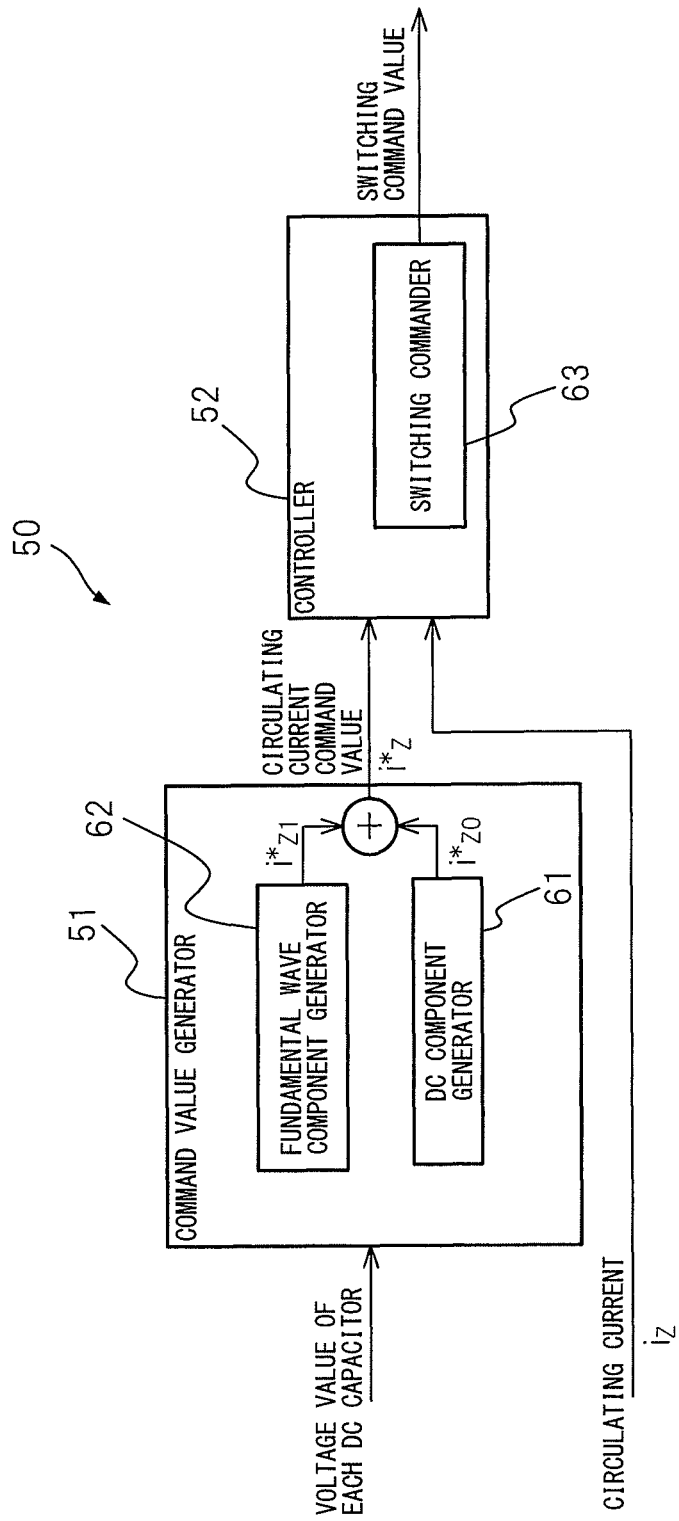

SINGLE-PHASE POWER CONVERTER, THREE-PHASE TWO-PHASE POWER CONVERTER, AND THREE-PHASE POWER CONVERTER

TECHNICAL FIELD

The present invention relates to a single-phase power converter and a three-phase power converter that bidirectionally convert direct current (DC) and alternating current (AC), and a three-phase to two-phase power converter that bidirectionally converts three-phase AC and two-phase AC, and more particularly, relates to a single-phase power converter, three-phase to two-phase power converter, and three-phase power converter of modular multilevel type.

BACKGROUND ART

With increases in opportunities for introducing wind power and solar power generation, the importance of battery energy storage devices is ever increasing. FIG. 24 is a diagram depicting a general configuration of a battery energy storage device. The battery energy storage device 1000 includes: a battery 100, such as a Sodium Sulfur (NAS) battery and lithium ion battery, an interconnection converter 200 that converts DC voltage of the battery 100 to AC voltage; and an interconnection transformer 300 that interconnects the interconnection converter 200 to an electric power system 400. In the case of the battery energy storage device 1000, since the DC voltage of the battery 100 is relatively lower than the voltage effective value of the electric power system 400, the interconnection converter 200 is required to provide a high step-up ratio. For this reason, a converter transformer has been conventionally used in a several-megawatt-class interconnection converter to transform power to high voltage and large capacity. However, using such a converter transformer causes the device to be larger and heavier.

To address such a problem, there has been proposed a modular multilevel converter (MMC) as a next generation transformer-less power converter that is easily implementable and suitable for use in applications that require large capacity and high voltage.

The modular multilevel converter has a characteristic in a point in which arms, where a plurality of bidirectional chopper cells or full bridge converter cells are connected in series, are configured as modules. By increasing the number of series cells, the AC output voltage can be increased while suppressing ripples of the voltage and current without giving the semiconductor switch high breakdown strength. Thus, apart from problems such as insulation, the modular multilevel converter is utilized as a high voltage and large capacity power converter. Since the modular multilevel converter is easily mountable and highly redundant and makes possible a smaller and lighter device, the modular multilevel converter can be applied to a motor drive device for a system interconnection power converter and an induction motor.

As the modular multilevel converter, there has been proposed, for example, a modular multilevel cascade converter (MMCC) (for example, refer to Patent Literature 1 and Non-Patent Literature 1-4).

PRIOR ART REFERENCES

Patent Literature

Patent Literature: Japanese Laid-open Patent Publication No. 2011-182517

Non-Patent Literature

Non-Patent Literature 1: HAGIWARA Makoto, AKAGI Hirofumi (July 2008). 'PWM Control and Experiment of Modular Multilevel Converters (MMC)' The transactions of the Institute of Electrical Engineers of Japan. D, publication of Industry Applications Society 128(7), pp. 957-965, (in Japanese).

Non-Patent Literature 2: NISHIMURA Kazutoshi, HAGIWARA Makoto, AKAGI Hirofumi (January 2009). 'Application to a Medium-Voltage Motor Drive with a Modular Multilevel PWM Inverter: Experimental Verification by a 400-V, 15-kW Downscaled Model' The papers of Technical Meeting on Semiconductor Power Converter, IEE Japan, SPC-09-24, pp. 19-24, (in Japanese).

Non-Patent Literature 3: AKAGI Hirofumi, HAGIWARA Makoto (March 2010). 'Classification and Terminology of the Modular Multilevel Cascade Converter (MMCC)' Annual Meeting of The Institute of Electrical Engineers of Japan, no. 4-043, pp. 71-72, (in Japanese).

Non-Patent Literature 4: HAGIWARA Makoto, MAEDA Ryo, AKAGI Hirofumi (March 2010). 'Theoretical Analysis and Control of the Modular Multilevel Cascade Converter (MMCC-DSCC)' Annual Meeting of The Institute of Electrical Engineers of Japan, no. 4-044, pp. 73-74, (in Japanese).

SUMMARY OF INVENTION

Problems to be Solved by the Invention

If a converter transformer is used to realize the high step-up ratio of an interconnection converter that converts the DC voltage of a battery energy storage device to AC voltage, the device will become larger and heavier.

If a modular multilevel converter that is easily mountable and suitable for large capacity and high voltage use is used, the converter transformer can be eliminated. However, there is a problem in that the interconnection transformer cannot be eliminated in view of voltage matching and electric insulation.

Further, wind power and solar power generation are expected to be in widespread use among ordinary households in the future, as well as industry, further requiring smaller, low-priced, and highly efficient battery energy storage devices.

Thus, smaller, low-priced, and more highly efficient power converters than the modular multilevel cascade converters (MMCC) described in Patent Literature and Non-Patent Literatures 1 to 4 are required.

Therefore, in consideration of the above problems, an objective of the present invention is to provide a single-phase power converter and three-phase power converter of modular multilevel type that bidirectionally convert DC and AC and are small, simply-structured, low-priced, and highly efficient, and a three-phase to two-phase power converter that bidirectionally converts three-phase AC and two-phase AC and is small, simply-structured, low-priced, and highly efficient.

Means for Solving the Problems

To realize the above objective, in the first to third embodiments, the single-phase power converter includes:

unit cells that each have: two semiconductor switches that are connected in series; a DC capacitor that is connected in parallel with the two semiconductor switches; and input and output terminals of a current that is discharged from the DC capacitor or charged in the DC capacitor according to switching operation of the semiconductor switches;

first and second arms that are each configured by one of the unit cells or a plurality of the unit cells that are cascade-connected to one another through the input and output terminals, where the first and second arms have the same number of unit cells;

an arm coupling unit that includes a first terminal to which an end of the first arm is connected, a second terminal to which an end of the second arm is connected, and a third terminal to which an end of a DC power supply is connected; and a transformer that includes AC input and output terminals on a primary side and an intermediate terminal on a secondary side winding, in which two end terminals of the secondary side winding are connected respectively to a terminal of an end of the first arm to which terminal the first terminal is not connected and a terminal of an end of the second arm to which terminal the second terminal is not connected, and the intermediate terminal is connected to a terminal of an end of the DC power supply to which terminal the third terminal is not connected.

According to the first aspect, the arm coupling unit is configured by a three-terminal coupling reactor that includes: the first terminal; the second terminal; and the third terminal that is an intermediate tap (an intermediate terminal) located on a winding between the first terminal and the second terminal.

According to the second aspect, the arm coupling unit is configured by two reactors that are connected to each other in series, and the two reactors include: the first terminal that is a terminal of one end of the serially-connected two reactors; the second terminal that is a terminal of the other end of the serially-connected two reactors; and the third terminal that is a series connection point of the serially-connected two reactors.

The third aspect includes: a reactor that is connected at an arbitrary position between the cascade-connected unit cells in each of the first arm and the second arm, in which the first terminal, the second terminal and the third terminal are connected to one another at the arm coupling unit.

In the fourth aspect, the single-phase power converter includes:

unit cells that each include two semiconductor switches that are connected in series, a DC capacitor that is connected in parallel with the two semiconductor switches, and input and output terminals of a current that is discharged from the DC capacitor or charged in the DC capacitor according to a switching operation of the semiconductor switches;

first and second arms that are each configured by one of the unit cells or a plurality of the unit cells that are cascade-connected to one another through the input and output terminals, where the first and second arms have the same number of unit cells;

an arm coupling unit that includes a first terminal between which and one end of the first arm a DC power supply is connected a second terminal between which and one end of the second arm another DC power supply is connected and a third terminal that is connected to the first terminal and the second terminal; and a transformer that includes AC input and output terminals on a primary side and a three-terminal coupling reactor on a secondary side winding, in which two end terminals of the secondary side winding are respectively connected to a terminal of an end of the first arm to which terminal the DC power supply is not connected and a terminal of an end of the second arm to which terminal the other DC power supply is not connected, and an intermediate terminal that is located on a winding between terminals of both ends of the three-terminal coupling reactor is connected to the third terminal.

In the fifth aspect, the single-phase power converter includes:

unit cells that each include two semiconductor switches that are connected in series, a DC capacitor that is connected in parallel with the two semiconductor switches, and input and output terminals of a current that is discharged from the DC capacitor or charged in the DC capacitor according to switching operation of the semiconductor switches;

first and second arms that are each configured by one of the unit cells or a plurality of the unit cells that are cascade-connected to one another through the input and output terminals, where the first and second arms have the same number of unit cells;

a first capacitor that is connected to a terminal of one end of the first arm to which terminal the DC power supply is connected;

a second capacitor that is connected to a terminal of one end of the second arm to which terminal the DC power supply is connected;

an arm coupling unit that includes a first terminal to which is connected a terminal of one end of the first capacitor to which terminal the first arm is not connected, a second terminal to which is connected a terminal of one end of the second capacitor to which terminal the second arm is not connected, and a third terminal that is connected to the first terminal and the second terminal; and a transformer that includes AC input and output terminals on a primary side and a three-terminal coupling reactor on a secondary side winding, in which two end terminals of the secondary side winding are respectively connected to a terminal of an end of the first arm to which terminal the first capacitor is not connected and a terminal of an end of the second arm to which terminal the second capacitor is not connected, and an intermediate terminal that is located on a winding between terminals of both ends of the three-terminal coupling reactor is connected to the third terminal.

Further, in the first to fifth aspects, the single-phase power converter includes: a command value generator that generates a circulating current command value based on a voltage value of the DC capacitor in the first arm and a voltage value of the DC capacitor in the second arm; and a controller that controls power so that a circulating current that is half of the sum of a current that flows the first arm and a current that flows the second arm follows the circulating current command value.

The above-described command value generator may generate the circulating current command value for controlling power so that a value obtained by averaging voltage values of all the DC capacitors in the first arm and the second arm follows a predetermined DC voltage command value using the value obtained by averaging the voltage values of all the DC capacitors in the first arm and the second arm.

Alternatively, the command value generator may have: a fundamental wave component generator that generates a fundamental wave component of the circulating current command value that is the same phase as a terminal voltage between the AC input and output terminals, using a difference between a value obtained by averaging all the voltage values of the DC capacitors in the first arm and a value obtained by averaging all the voltage values of the DC capacitors in the second arm; and a DC component generator that generates a DC component of the circulating current command value for controlling power so that a value obtained by averaging voltage values of all the DC capacitors in the first arm and the second arm follows a predetermined DC voltage command value using the value obtained by averaging the voltage values of all the DC capacitors in the first arm and the second arm, and the command value generator may generate the circulating current command value by adding the fundamental wave component and the DC component. The above-described fundamental wave component is a value for controlling to nullify a difference between a value obtained by averaging all the voltage values of the DC capacitors in the first arm and a value obtained by averaging all the voltage values of the DC capacitors in the second arm.

Further, the controller may also perform a control so that a voltage value of each of the DC capacitors in the first arm follows the value obtained by averaging the voltage values of all the DC capacitors in the first arm, as well as, a voltage value of each of the DC capacitors in the second arm follows the value obtained by averaging the voltage values of all the DC capacitors in the second arm.

The controller includes a switching commander that causes the semiconductor switches to perform switching operation in accordance with the follow control.

Further, each of the semiconductor switches has: a semiconductor switching element that passes a current in one direction when the semiconductor switch is on; and a free wheel diode that is connected in anti-parallel with the semiconductor switching element.

A three-phase power converter may be configured by including three single-phase power converters for three phases, each single-phase power converter being according to any one of the first to fifth aspects, in which the transformer in each of the single-phase power converter configures each phase of the three-phase transformer that includes a star connection on a primary side and an open star connection on a secondary side, and each single-phase power converter is commonly connected to the DC power supply.

A three-phase to two-phase power converter may be configured by including two single-phase power converters for two phases, each single-phase power converter being according to any one of the first to fifth aspects, in which a secondary side winding of the transformer in each of the single-phase power converter configures a winding of each phase in a secondary side of a Scott transformer, and each single-phase power converter is commonly connected to the DC power supply.

Effect of the Invention

According to the present invention, a single-phase power converter, three-phase to two-phase power converter, and three-phase power converter that bidirectionally convert DC and AC and that are small, simply-structured, low-priced, and highly efficient can be realized.

Using the single-phase power converter, three-phase to two-phase power converter, and three-phase power converter, a battery energy storage device can be interconnected to an electric power system without using a converter transformer, and thus the device can be smaller and lighter.

Moreover, the conventional modular multilevel converter has a problem in that the interconnection transformer cannot be eliminated in view of voltage matching and electric insulation, while, according to the present invention, since a DC power supply with low voltage and large current can be interconnected to an electric power system, the electric insulating structure on the DC side can be constructed more easily than when the conventional modular multilevel converter is used.

The three-phase power converter according to the present invention is optimum in terms of use for a battery energy storage device that has low voltage and large current on the DC side, since the three-phase power converter can be interconnected to a system with half the DC voltage compared with the conventional three-phase modular multilevel cascade converters described in Patent Literature 1 and Non-Patent Literature 1 to 4, and the electric insulating structure on the DC side can be easily constructed.

As such, by realizing the interconnection with half the DC voltage of the conventional techniques, the following advantages can be obtained: First, in principle, as a characteristic of an assembled battery, reliability is higher as the voltage is lower. The present invention offers an advantage of high reliability as the interconnection is realized with half the DC voltage. Secondly, there is an advantage in that, since the DC voltage is lower, the applicability of existing techniques increases. Specifically, if the DC voltage level is lowered, for example, from 1500V to 700V by application of the present invention, the DC voltage level becomes closer to the low voltage electric equipment field wherein various existing techniques can be used. Thus, the applicability of the existing proven techniques increases, offering advantages in terms of enhancing the reliability and facilitating easier protection and insulation. For example, in a high voltage region of 2000V or more, the fields of application are limited, thus, there are problems in that: reliability is lowered; protection and insulation are difficult; and components such as voltage sensors and capacitors are expensive. These and other problems can be avoided by realizing interconnection with half the DC voltage by application of the present invention.

Further, since the three-phase power converter of the present invention also functions as an interconnection transformer, the three-phase power converter can be utilized as a small and low-cost power converter compared with conventional techniques for interconnecting to the electric power system.

BRIEF DESCRIPTION OF THE DRAWINGS

FIG. 10 is a block diagram depicting the DC capacitor control device of the three-phase power converter according to the sixth example;

DESCRIPTION OF THE EMBODIMENTS

Figure 1:
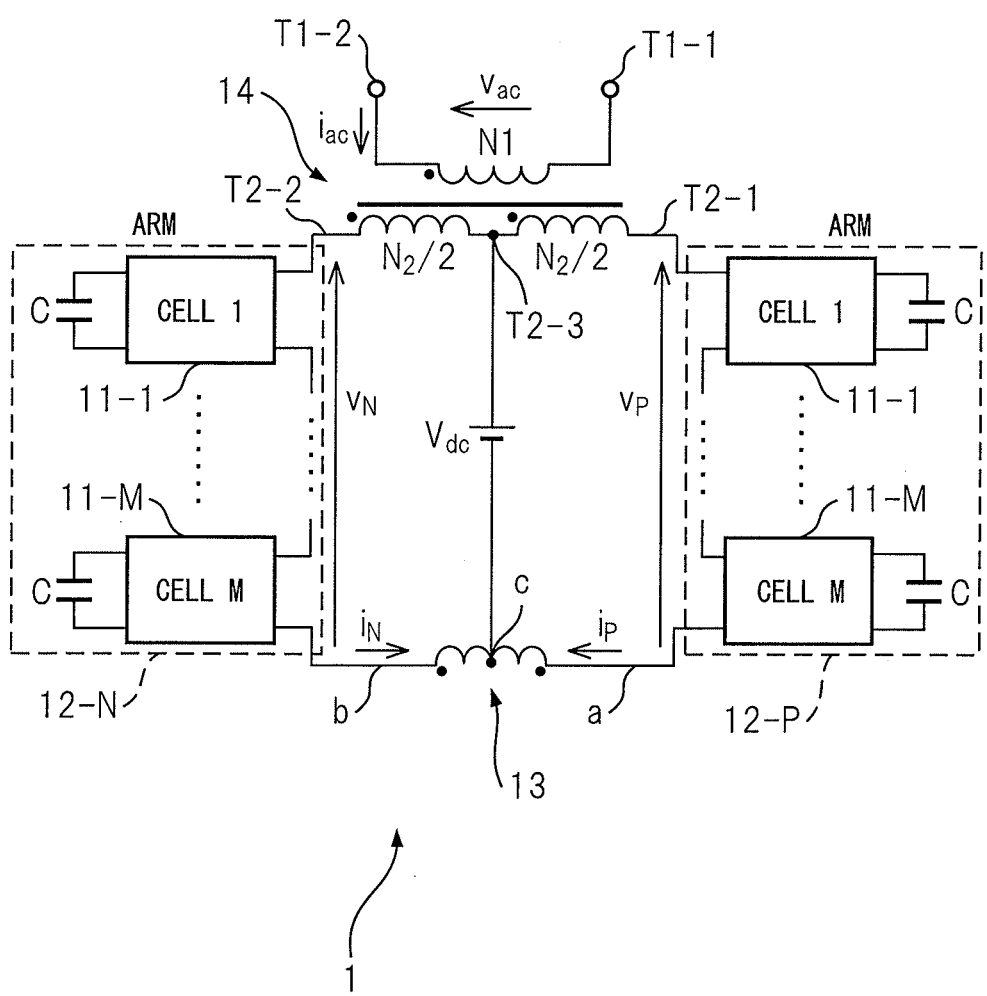
FIG. 1 is a circuit diagram depicting a single-phase power converter according to the first example.
Figure 2A:
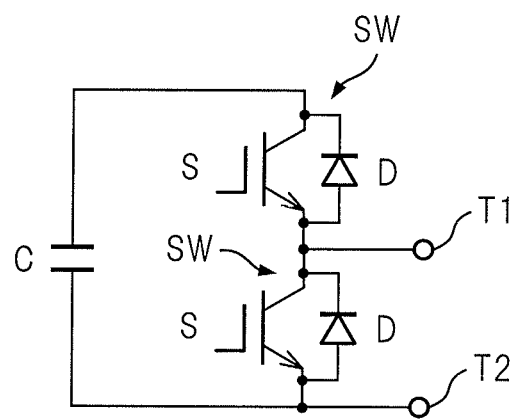
FIG. 2A is a circuit diagram depicting a chopper cell as a unit cell in the single-phase power converter according to the first to fifth examples.
Figure 2B:
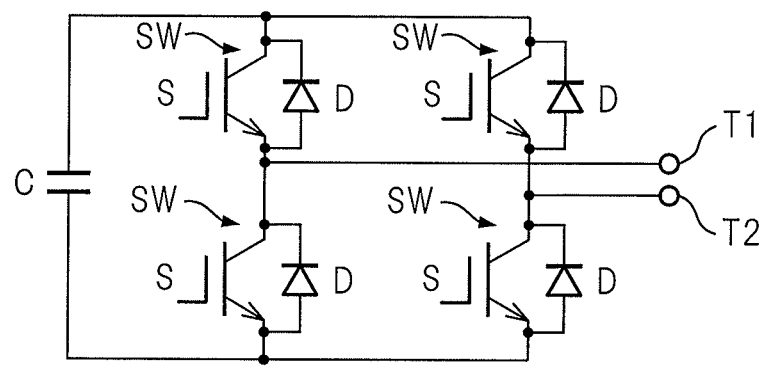
FIG. 2B is a circuit diagram depicting a bridge cell as a unit cell in the single-phase power converter according to the first to fifth examples.

FIG. 1 is a circuit diagram depicting a single-phase power converter according to the first example. Hereinafter, the elements denoted by the same reference signs in different diagrams mean elements having the same functions. It should also be noted that, hereinafter, DC capacitors in the unit cells are described outside the unit cells for easy understanding. FIG. 2A is a circuit diagram depicting a chopper cell as a unit cell in the single-phase power converter according to the first to fifth examples. FIG. 2B is a circuit diagram depicting a bridge cell as a unit cell in the single-phase power converter according to the first to fifth examples.

The single-phase power converter according to the first example includes unit cells 11-1 to 11-M (where M is a natural number), a first arm 12-P, a second arm 12-N, an arm coupling unit 13, and a transformer 14.

The unit cells 11-1 to 11-M each have two semiconductor switches that are connected in series, a DC capacitor that is connected in parallel with the two semiconductor switches, and input and output terminals of a current that is discharged from or charged to the DC capacitor in response to the switching operation of the semiconductor switches. The unit cells 11-1 to 11-M may be either the chopper cell depicted in FIG. 2A or the bridge cell depicted in FIG. 2B.

The chopper cell depicted in FIG. 2A is a bidirectional chopper cell that includes two semiconductor switches SW that are connected in series, a DC capacitor C that is connected in parallel with the two semiconductor switches SW, and input and output terminals T1 and T2 of a current that is discharged from the DC capacitor C or charged to the DC capacitor C in response to the switching operation of the semiconductor switches SW. The terminals of both ends of one of the two semiconductor switches are defined as the input and output terminals T1 and T2 of the chopper cell (a unit cell).

The bridge cell depicted in FIG. 2B is configured by connecting, in parallel, two sets of two serially connected semiconductor switches SW and further connecting a DC capacitor in parallel therewith. The series connection points of respective sets of the two serially connected semiconductor switches SW are defined as the input and output terminals T1 and T2 of a current that is discharged from the DC capacitor C or charged to the DC capacitor C.

In either of the unit cells depicted in FIGS. 2A and 2B, each semiconductor switch SW has: a semiconductor switching element S that passes a current in one direction when the semiconductor switch is on; and a free wheel diode D that is connected in anti-parallel with the semiconductor switching element. The voltage that one unit cell outputs appears across the input and output terminals T1 and T2 of the unit cell.

As depicted in FIG. 1, the first arm 12-P and the second arm 12-N each have one unit cell 11-1, or the same number of a plurality of unit cells 11-1 to 11-M (M is a natural number) that are cascade-connected to one another through the input and output terminals T1 and T2.

The arm coupling unit 13 has: a first terminal a that is connected to the lower side terminal of the first arm 12-P; a second terminal b that is connected to the lower side terminal of the second arm 12-N, and a third terminal c that is connected to the anode-side terminal of the DC power supply $V_{dc}$.

In the first example, as depicted in FIG. 1, the above-described arm coupling unit 13 is configured by a three-terminal coupling reactor that has: the first terminal a; the second terminal b; and the third terminal c that is an intermediate tap located on the winding between the first terminal a and the second terminal b. In FIG. 1, the polarities of the three-terminal coupling reactor are expressed by black dots (•). The polarity of the winding between the first terminal a and the third terminal c is set so as to be opposite to the polarity of the winding between the third terminal c and the second terminal b (oriented in a contrary direction in the example of FIG. 1).

The transformer 14 includes AC input and output terminals T1-1 and T1-2 on the primary side, and, on the secondary side, an intermediate terminal T2-3 that is a center tap on the secondary side winding between the two end terminals T2-1 and T2-2. The AC output voltage of the single-phase power converter 1 appears across the AC input and output terminals T1-1 and T1-2 on the primary side of the transformer 14 and across the input and output terminals T1 and T2. The winding number of the primary side winding of the transformer 14 is defined as $N_1$, and the winding number of the secondary side winding is defined as $N_2$. Therefore, on the secondary side, the winding number of the winding between the end terminal T2-1 and the intermediate terminal T2-3, and the winding number of the winding between the intermediate terminal T2-3 and the end terminal T2-2 are both $N_2/2$.

In FIG. 1, the polarities of the primary side winding and the secondary side winding of the transformer 14 are expressed by black dots (•). On the secondary side winding, the polarity of the winding between the end terminal T2-1 and the intermediate terminal T2-3 and the polarity of the winding between the intermediate terminal T2-3 and the end terminal T2-2 are set so as to be in the same directions (left directions in the example of FIG. 1). On the other hand, the direction of polarity of the primary side winding does not have to be the same as the direction of the polarity of the secondary side winding.

The end terminal T2-1 of the secondary side winding of the transformer 14 is connected to the terminal of an end of the first arm 12-P to which terminal the first terminal a of the arm coupling unit 13 is not connected, i.e., the upper side terminal of the first arm 12-P, and the end terminal T2-2 of the secondary side winding of the transformer 14 is connected to the terminal of an end of the second arm 12-N to which terminal the second terminal b of the arm coupling unit 13 is not connected, i.e., the upper side terminal of the second arm 12-N. The intermediate terminal T2-3 of the transformer 14 is connected to the terminal of an end of the DC power supply $V_{dc}$ to which terminal is not connected the third terminal c of the arm coupling unit 13, i.e., the cathode-side terminal of the DC power supply $V_{dc}$.

In the following, the operation of the single-phase power converter 1 according to the first example will be analyzed using mathematical formulas.

The AC voltage $v_{ac}$ of the single-phase power converter 1 appears across the AC input and output terminals T1-1 and T1-2 on the primary side of the transformer 14 and across the input and output terminals T1 and T2. The AC current is defined as $i_{ac}$. The arm current that flows in the first arm 12-P is defined as $i_P$, and the arm current that flows in the second arm 12-N is defined as $i_N$. When the voltage that appears across the input and output terminals (T1 and T2 in FIGS. 2A and 2B) of each unit cell 11-$j$ (j=1 to M) in the first arm 12-P is defined as $v_{Pj}$, and the voltage that appears across the input and output terminals (T1 and T2 in FIGS. 2A and 2B) of each unit cell 11-$j$ (where j=1 to M) in the second arm 12-N is defined as $v_{Nj}$, the total output voltage $v_P$ of the first arm 12-P and the total output voltage $v_N$ of the second arm 12-N are expressed by formulas 1 and 2, respectively.

[formula 1]

$$v_P = \sum_{j=1}^{M} v_{Pj} \quad (1)$$

[formula 2]

$$v_N = \sum_{j=1}^{M} v_{Nj} \quad (2)$$

When the modulation degree is defined as m (0≤m≤1), and the angular frequency is defined as ω, the total output voltage $v_P$ of the first arm 12-P and the total output voltage $v_N$ of the second arm 12-N are expressed by formulas 3 and 4, respectively.

[formula 3]

$$v_P = V_{dc}(1 - m \sin wt) \quad (3)$$

[formula 4]

$$v_N = V_{dc}(1 + m \sin wt) \quad (4)$$

The circulating current is defined as formula 5.

[formula 5]

$$i_z = \frac{1}{2}(i_P + i_N) \quad (5)$$

The three-terminal coupling reactor of the arm coupling unit 13 includes an inductance L only for the circulating current $i_z$, and thus the voltage equations as expressed by formulas 6 and 7 are derived.

[formula 6]

$$V_{dc} - \frac{N_2}{2N_1} V_{ac} = v_P + \frac{L}{2} \frac{di_z}{dt} \quad (6)$$

[formula 7]

$$V_{dc} + \frac{N_2}{2N_1} V_{ac} = v_N + \frac{L}{2} \frac{di_z}{dt} \quad (7)$$

Formulas 8 and 9 can be obtained from formulas 3, 4, 6 and 7.

[formula 8]

$$V_{ac} = 2\frac{N_1}{N_2} V_{dc} \sin wt \quad (8)$$

[formula 8]

$$\frac{di_z}{dt} = 0 \quad (9)$$

As can be seen from formula 9, the circulating current $i_Z$ is a direct current. In other words, the arm current $i_P$ that flows in the first arm 12-P and the arm current $i_N$ that flows in the second arm 12-N both include a DC component. DC magnetic flux is not generated, since the magnetic fluxes of direct currents cancel one another in the transformer. It should be noted that the relation of $v_P + v_N = 2V_{dc}$ was used for derivation of the above formula 9. In practice, however, the relation becomes $v_P + v_N \neq 2V_{dc}$ due to the influence of harmonic voltages and dead time, and the harmonic currents overlay the circulating current $i_Z$. Therefore, in the first example, the three-terminal coupling reactor of the arm coupling unit 13 is indispensable for diminishing such harmonic currents.

In contrast, when the alternating current component included in the arm current $i_P$ that flows in the first arm 12-P and the arm current $i_N$ that flows in the second arm 12-N are respectively defined as $(i_P)_{ac}$ and $(i_N)_{ac}$, formula 10 can be obtained based on the relation of the magnetomotive force of the transformer.

[formula 10]

$$N_1 i_{ac} = -\frac{N_2}{2}(i_P)_{ac} + \frac{N_2}{2}(i_N)_{ac} \quad (10)$$

If the relation $(i_P)_{ac} = -(i_N)_{ac}$ is assumed in formula 10, formulas 11 and 12 can be obtained.

[formula 11]

$$(i_P)_{ac} = -\frac{N_1}{N_2} i_{ac} \quad (11)$$

[formula 12]

$$(i_N)_{ac} = \frac{N_1}{N_2} i_{ac} \quad (12)$$

On the other hand, based on formula 5 and Kirchhoff's Current Law, the relationship between the direct current $i_{dc}$ of the DC power supply $V_{dc}$ and the circulating current $i_Z$ thereof can be expressed by formula 13.

[formula 13]

$$i_{dc} = i_P + i_N = 2i_Z \quad (13)$$

Finally, the arm current $i_P$ that flows in the first arm 12-P and the arm current $i_N$ that flows in the second arm 12-N can be expressed by formulas 14 and 15 respectively.

[formula 14]

$$i_P = i_Z - \frac{N_1}{N_2} i_{ac} = \frac{i_{dc}}{2} - \frac{N_1}{N_2} i_{ac} \quad (14)$$

[formula 15]

$$i_N = i_Z + \frac{N_1}{N_2} i_{ac} = \frac{i_{dc}}{2} + \frac{N_1}{N_2} i_{ac} \quad (15)$$

The alternating current $i_{ac}$ of FIG. 1 can be given by formula 16.

[formula 16]

$$i_{BC} = I_{ac} \sin(wt - \phi) \quad (16)$$

Here, $I_{ac}$ expresses the amplitude of the alternating current $i_{ac}$, and $\phi$ expresses a phase difference between the alternating current $i_{ac}$ and alternating voltage $v_{ac}$. Based on formulas 8 and 16, the relation of formula 17 is derived for the average electric power of the DC side and AC side of the transformer 14.

[formula 17]

$$V_{dc} I_{dc} = -\frac{N_1}{N_2} n V_{dc} I_{ac} \cos\phi \quad (17)$$

$I_{dc}$ expresses a direct current. Finally, the instantaneous effective power that flows in the first arm 12-P and the second arm 12-N can be expressed by formulas 18 and 19 respectively.

[formula 18]

$$v_P \cdot i_P = V_{dc}(1 - m\sin wt)\left(\frac{i_{dc}}{2} - \frac{N_1}{N_2} i_{ac}\right) \quad (18)$$

[formula 19]

$$v_N \cdot i_N = V_{dc}(1 + m\sin wt)\left(\frac{i_{dc}}{2} + \frac{N_1}{N_2} i_{ac}\right) \quad (19)$$

When the direct current component (the average value) included in the above instantaneous effective power is respectively expressed by $(v_P \cdot i_P)_{dc}$ and $(v_N \cdot i_N)_{dc}$, formula 20 can be obtained when formulas 16 and 17 are substituted for formulas 18 and 19. In this case, $i_{dc} = I_{dc}$ is supposed.

[formula 20]

$$(v_P \cdot i_P)_{dc} = (v_N \cdot i_N)_{dc} = 0 \quad (20)$$

From formula 20, it can be understood that stationary transferring of power does not occur between the first arm 12-P and the second arm 12-N in the single-phase power converter 1.

Figure 3:
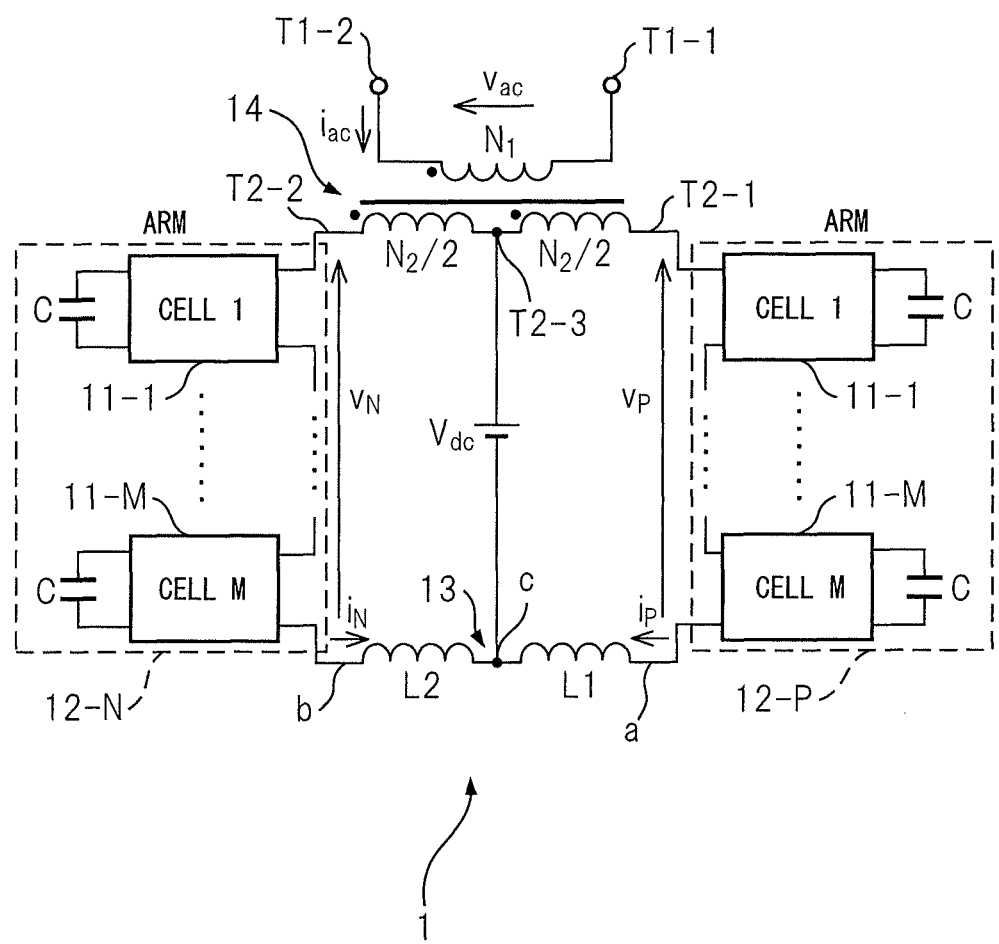
FIG. 3 is a circuit diagram depicting a single-phase power converter according to the second example.

FIG. 3 is a circuit diagram depicting the single-phase power converter according to the second example. The single-phase power converter 1 according to the second example is configured by using a normal reactor, i.e., an uncoupling reactor, instead of a three-terminal coupling reactor, for the arm coupling unit 13 of the first example that has been described with reference to FIGS. 1, 2A and 2B. It should be noted that, since other circuit elements are the same as the unit cells 11-1 to 11-M, the first arm 12-P, the second arm 12-N, and the transformer 14 depicted in FIG. 1, and the unit cells depicted in FIGS. 2A and 2B, the same circuit elements are denoted by the same signs, and thus detailed description of such circuit elements is omitted.

In the second example, as depicted in FIG. 3, the arm coupling unit 13 is configured by two reactors L1 and L2 that are connected to each other in series, and includes a first terminal a as a terminal of one end of the reactor L1, a second terminal b as a terminal of one end of the reactor L2, and a third terminal c that is a series connection point of the two serially connected reactors L1 and L2. It should be noted that the reactor may be replaced with a leakage inductance of the transformer.

Figure 4A:
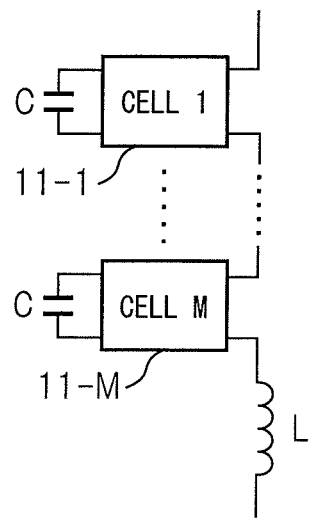
FIG. 4A is a circuit diagram depicting a circuit configuration of the arm coupling unit of the single-phase power converter according to the third example.
Figure 4B:
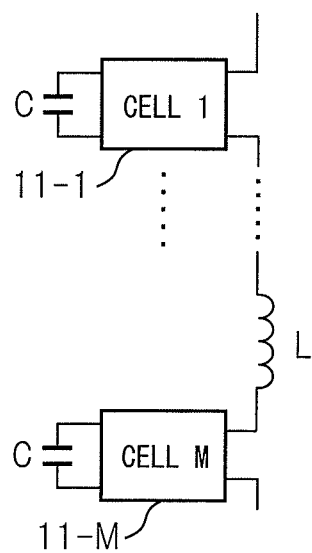
FIG. 4B is a circuit diagram depicting a circuit configuration of the arm coupling unit of the single-phase power converter according to the third example.
Figure 4C:
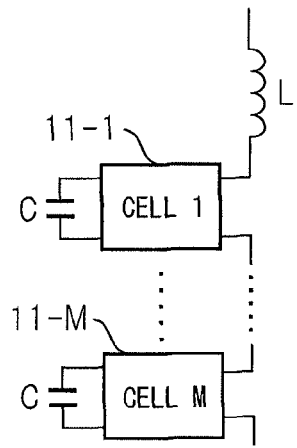
FIG. 4C is a circuit diagram depicting a circuit configuration of the arm coupling unit of the single-phase power converter according to the third example.

FIGS. 4A to 4C are circuit diagrams depicting the circuit configurations of the arm coupling units of the single-phase power converter according to the third example. The single-phase power converter 1 according to the third example has a change in the position of the reactor L that configures the arm coupling unit 13 in the second example as described with reference to FIG. 3. FIGS. 4A to 4C represent only the first or second arm that includes the unit cells 11-1 to 11-M and the reactor L that configures the arm coupling unit 13 in the single-phase power converter. In the third example, as depicted in FIGS. 4A to 4C, as the arm coupling unit 13 includes a reactor L that is connected at an arbitrary position among the cascade-connected unit cells 11-1 to 11-M in the first arm and the second arm, the first terminal a, the second terminal b, and the third terminal c of the arm coupling unit 13 depicted in FIG. 3 are changed to be connected to one another. Other circuit elements are the same as those of the second example. It should be noted that the reactor may be replaced with a leakage inductance of the transformer.

Figure 5:
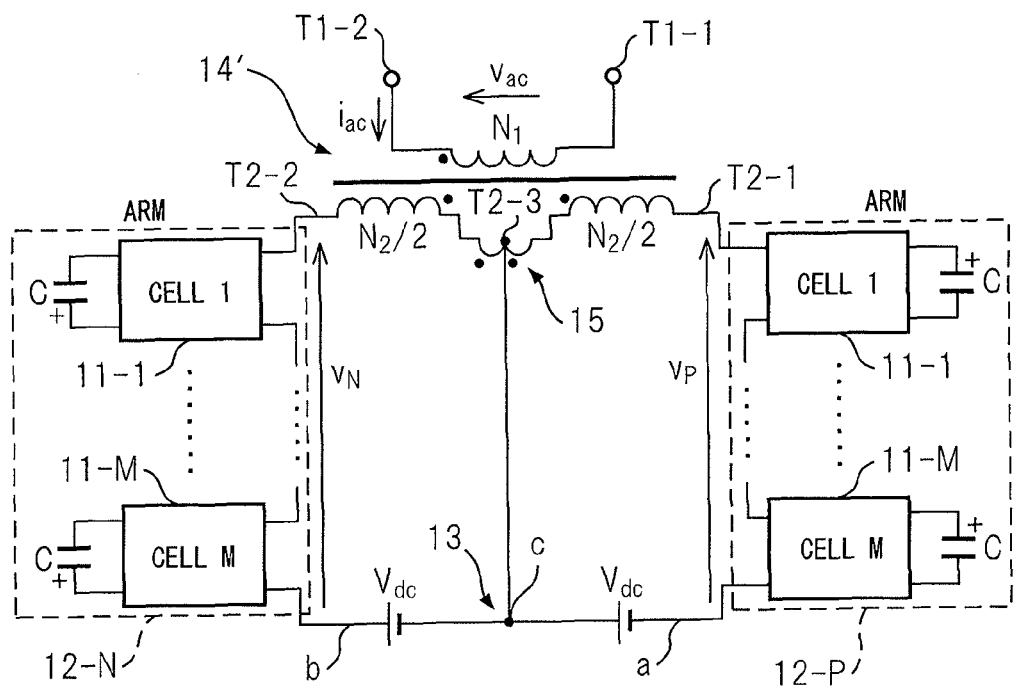
FIG. 5 is a circuit diagram depicting a single-phase power converter according to the fourth example.

FIG. 5 is a circuit diagram depicting the single-phase power converter according to the fourth example. The single-phase power converter 1 according to the fourth example is the one of the first example described with reference to FIGS. 1, 2A and 2B, with changes in the arm coupling unit 13 and the transformer 14.

The unit cells 11-1 to 11-M and the first arm 12-P and the second arm 12-N are the same as the first example as described with reference to FIGS. 1, 2A, and 2B, and thus a detailed description is omitted. In the same way as the first example, the unit cells 11-1 to 11-M each have: two semiconductor switches that are connected in series; a DC capacitor that is connected in parallel with the two semiconductor switches; and input and output terminals of a current that is discharged from or charged to the DC capacitor according to the switching operation of the semiconductor switches. The unit cells may be either the chopper cell depicted in FIG. 2A or the bridge cell depicted in FIG. 2B. In the same way as the first example, the first arm 12-P and the second arm 12-N each have one unit cell 11-1 or the same number of a plurality of unit cells 11-1 to 11-M (M is a natural number) that are cascade-connected to one another through the input and output terminals T1 and T2.

The arm coupling unit 13 has: a first terminal a to which the lower side terminal of the first arm 12-P and the DC power supply $V_{dc}$ are connected; a second terminal b that is connected between the lower side terminal of the second arm 12-N and another DC power supply $V_{dc}$; and a third terminal c that is connected to the terminal of the other end of the DC power supply $V_{dc}$ than the terminal of the first terminal a side and the terminal of the other end of the other DC power supply $V_{dc}$ than the terminal of the second terminal b side.

As depicted in FIG. 5, in the transformer 14' according to the fourth example, a three-terminal coupling reactor 15 is provided at the position where the intermediate terminal of the transformer 14 was located in the single-phase power converter 1 of the first example as described with reference to FIG. 1. Thus, the three-terminal coupling reactor 15 is located on the secondary side winding of the transformer 14'. The AC output voltage of the single-phase power converter 1 appears across the AC input and output terminals T1-1 and T1-2 on the primary side of the transformer 14' and across the input and output terminals T1 and T2. The winding number of the primary side winding of the transformer 14' is defined as $N_1$, and the winding number of the secondary side winding is defined as $N_2$. Therefore, on the secondary side, the winding number of the winding between the end terminal T2-1 and the three-terminal coupling reactor 15, and the winding number of the winding between the three-terminal coupling reactor 15 and the end terminal T2-2 are both $N_2/2$.

The end terminal T2-1 of the secondary side winding of the transformer 14' is connected to the terminal of an end of the first arm 12-P to which terminal the DC power supply $V_{dc}$ is not connected, i.e., the upper side terminal of the first arm 12-P, and the end terminal T2-2 of the secondary side winding of the transformer 14' is connected to the terminal of an end of the second arm 12-N to which terminal the other DC power supply $V_{dc}$ is not connected, i.e., the upper side terminal of the second arm 12-N. Further, the intermediate terminal T2-3 located on the winding between the terminals of both ends of the three-terminal coupling reactor 15 is connected to the third terminal c of the arm coupling unit 13.

In FIG. 5, the polarities of the primary side winding and the secondary side winding of the transformer 14' are expressed by black dots (•). On the secondary side winding, the polarity of the winding between the end terminal T2-1 and the intermediate terminal T2-3 and the polarity of the winding between the intermediate terminal T2-3 and the end terminal T2-2 are in opposite directions (opposing to each other in the example of FIG. 5). On the other hand, the direction of polarity of the primary side winding does not have to be the same as the direction of the polarity of the secondary winding. As for the directions of polarity of the three-terminal coupling reactor, the polarities of two windings between the intermediate terminal T2-3 and the terminals of both ends of the three-terminal coupling reactor 15 are in the same directions (left directions in the example of FIG. 5). The direction of polarity of the three-terminal coupling reactor can be in right directions in the example of FIG. 5.

Figure 6:
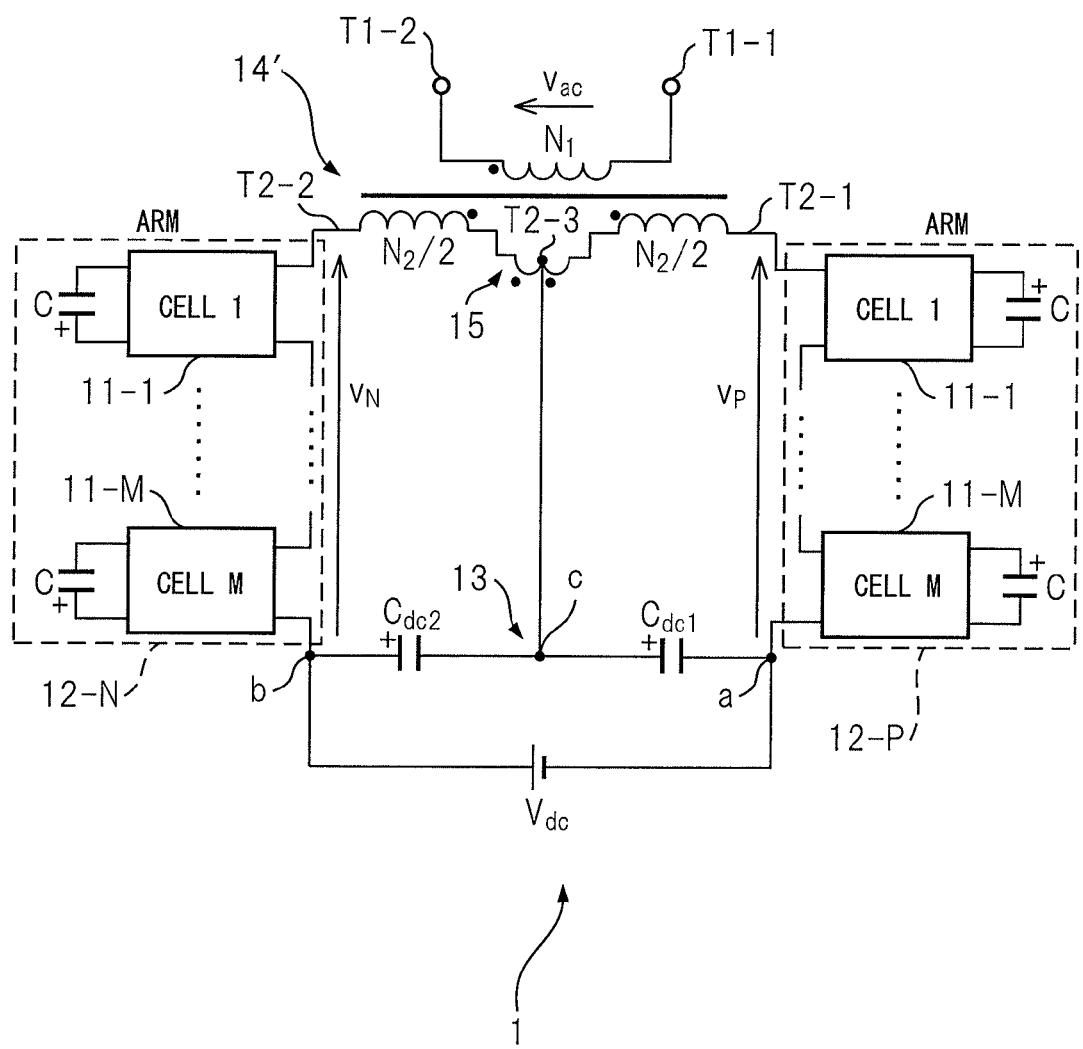
FIG. 6 is a circuit diagram depicting a single-phase power converter according to the fifth example.

FIG. 6 is a circuit diagram depicting the single-phase power converter according to the fifth example. In the single-phase power converter 1 according to the fifth example, the arm coupling unit 13 of the fourth example described with reference to FIG. 5 and the connection relation between the arm coupling unit 13 and the DC power supply are changed, and capacitors are newly provided in accordance with the change.

The unit cells 11-1 to 11-M and the first arm 12-P and the second arm 12-N are the same as the first example as described with reference to FIGS. 1, 2A, and 2B. In the same way as the first example, the unit cells 11-1 to 11-M have two semiconductor switches that are connected in series, a DC capacitor that is connected in parallel with the two semiconductor switches, and input and output terminals of a current that is discharged from or charged to the DC capacitor in response to the switching operation of the semiconductor switches. The unit cells 11-1 to 11-M may be either the chopper cell depicted in FIG. 2A or the bridge cell depicted in FIG. 2B. In the same way as the first example, the first arm 12-P and the second arm 12-N each have one unit cell 11-1, or the same number of a plurality of unit cells 11-1 to 11-M (M is a natural number) that are cascade-connected to one another through the input and output terminals T1 and T2. The DC power supply $V_{dc}$ is connected between the lower side terminal of the first arm 12-P and the lower side terminal of the second arm 12-N.

The first capacitor $C_{dc1}$ is connected to the terminal of an end of the first arm 12-P to which terminal the DC power supply $V_{dc}$ is connected (i.e., the lower side terminal of the first arm 12-P). The second capacitor $C_{dc2}$ is connected to the terminal of an end of the second arm 2-N to which terminal the DC power supply $V_{dc}$ is connected (i.e., the lower side terminal of the second arm 12-N). The first capacitor $C_{dc1}$ and the second capacitor $C_{dc2}$ are connected in series, and the serially connected first capacitor $C_{dc1}$ and second capacitor $C_{dc2}$ are connected to the DC power supply $V_{dc}$ in parallel. The directions of the polarities of the first capacitor $C_{dc1}$ and the second capacitor $C_{dc2}$ are oriented to the direction of the polarity of the DC power supply $V_{dc}$.

The arm coupling unit 13 has: a first terminal a to which is connected the terminal of an end of the first capacitor $C_{dc1}$ to which terminal the first arm 12-P is connected; a second terminal b to which is connected the terminal of an end of the second capacitor $C_{dc2}$ to which the second arm 12-N is connected; and a third terminal c that is connected to the terminal of the other end of the first capacitor $C_{dc1}$ than the first terminal a side and the terminal of the other end of the second capacitor $C_{dc2}$ than the second terminal b side.

In the same way as the fourth example, in the transformer 14' according to the fifth example, a three-terminal coupling reactor 15 is provided at the position where the intermediate terminal of the transformer 14 was located in the single-phase power converter 1 of the first example as described with reference to FIG. 1. Thus, the three-terminal coupling reactor 15 is located on the secondary side winding of the transformer 14'. The AC output voltage of the single-phase power converter 1 appears between the AC input and output terminals T1-1 and T1-2 on the primary side of the transformer 14' and between the input and output terminals T1 and T2. The winding number of the primary side winding of the transformer 14' is defined as $N_1$, and the winding number of the secondary side winding thereof is defined as $N_2$. Therefore, on the secondary side, the winding number of the winding between the end terminal T2-1 and the three-terminal coupling reactor 15, and the winding number of the winding between the three-terminal coupling reactor 15 and the end terminal T2-2 are both $N_2/2$.

The end terminal T2-1 of the secondary side winding of the transformer 14' is connected to the terminal of an end of the first arm 12-P to which terminal the DC power supply $V_{dc}$ is not connected, i.e., the upper side terminal of the first arm 12-P, and the end terminal T2-2 of the secondary side winding of the transformer 14' is connected to the terminal of an end of the second arm 12-N to which terminal the DC power supply $V_{dc}$ is not connected, i.e., the upper side terminal of the second arm 12-N. Further, the intermediate terminal T2-3 located on the winding between the terminals of both ends of the three-terminal coupling reactor 15 is connected to the third terminal c of the arm coupling unit 13.

In FIG. 6, the polarities of the primary side winding and the secondary side winding of the transformer 14' are expressed by black dots (•). On the secondary side winding, the polarity of the winding between the end terminal T2-1 and the intermediate terminal T2-3 and the polarity of the winding between the intermediate terminal T2-3 and the end terminal T2-2 are in opposite directions (opposing to each other in the example of FIG. 6). On the other hand, the direction of the polarity of the primary side winding does not have to be the same as the direction of the polarity of the secondary winding. As for the direction of polarity of the three-terminal coupling reactor, the polarities of two windings between the intermediate terminal T2-3 and the terminals of both ends of the three-terminal coupling reactor 15 are in the same directions (left directions in the example of FIG. 6). The direction of polarity of the three-terminal coupling reactor can be the in right direction in the example of FIG. 6.

A three-phase power converter may be configured using the single-phase power converter 1 according to the first to fifth examples as described above for three phases, and a three-phase to two-phase power converter may be configured using the single-phase power converter 1 according to the first to fifth examples for two phases. Next, the three-phase power converter will be described as sixth and seventh examples. It should be noted that the three-phase to two-phase power converter will be described later herein as an eighth example.

Figure 7:
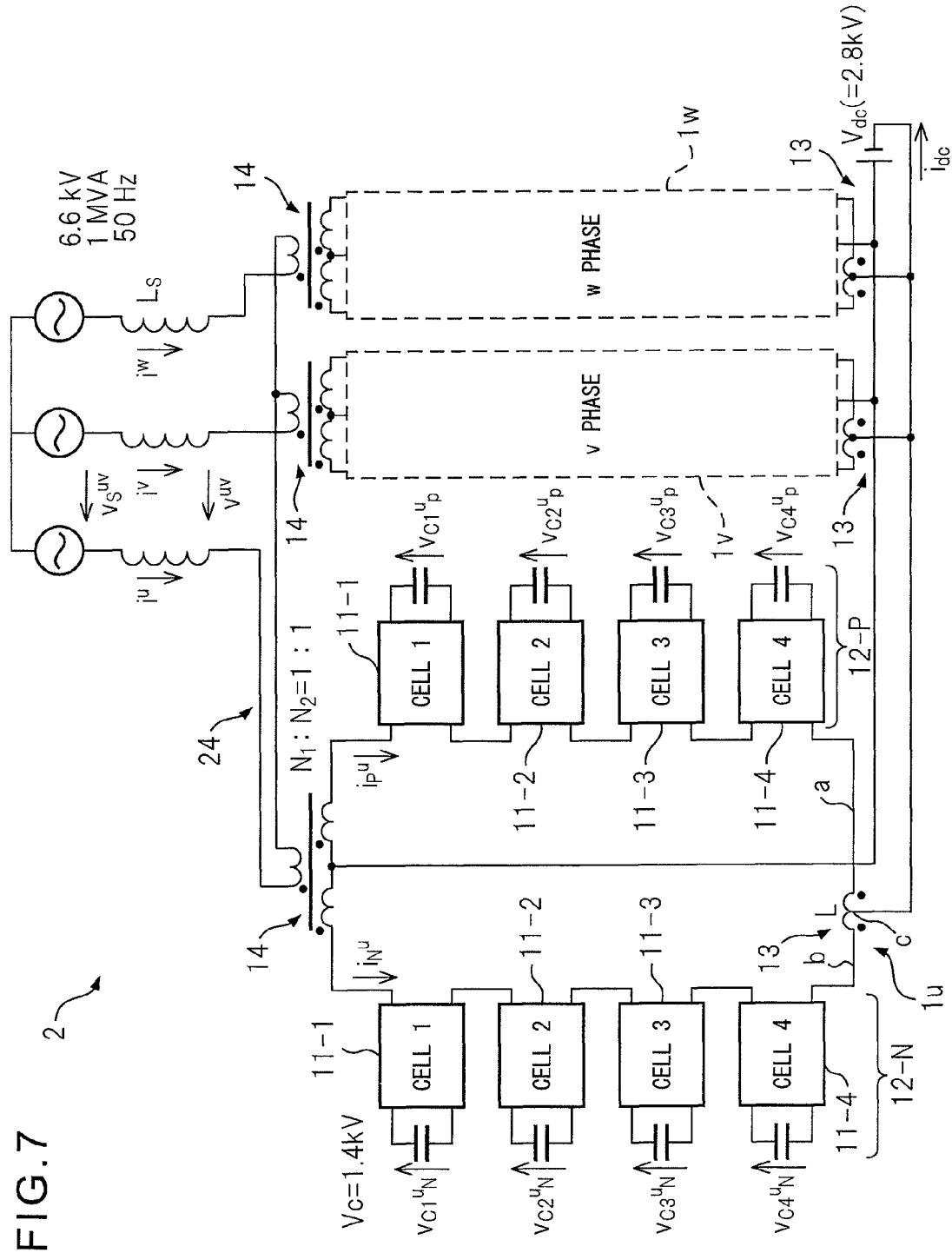
FIG. 7 is a circuit diagram depicting a three-phase power converter according to the sixth example.
Figure 8A:
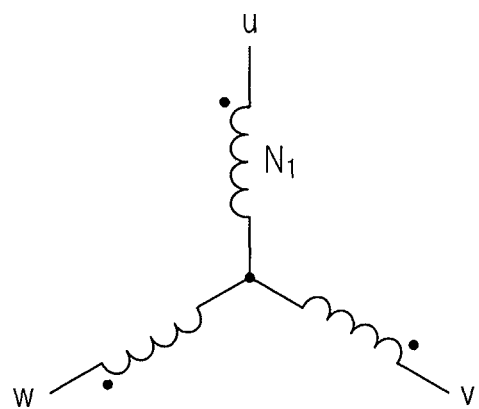
FIG. 8A is a circuit diagram depicting the transformer of the three-phase power converter depicted in FIG. 7.
Figure 8B:
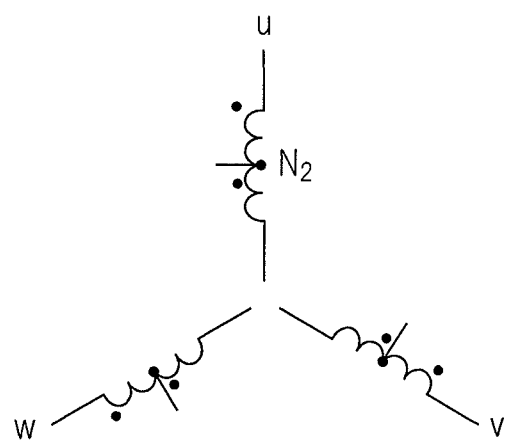
FIG. 8B is a circuit diagram depicting the transformer of the three-phase power converter depicted in FIG. 7.

FIG. 7 is a circuit diagram depicting a three-phase power converter according to the sixth example. FIGS. 8A and 8B are circuit diagrams depicting the transformer of the three-phase power converter depicted in FIG. 7. While, in the sixth example, the single-phase power converter according to the first example is used, as an example, to configure the three-phase power converter, the single-phase power converter according to the second to fifth examples may also be used to configure the three-phase power converter in the same way. The case of configuring the three-phase power converter using the single-phase power converter according to the fifth example will be described in the seventh example later herein.

In FIG. 7, the single-phase power converters provided for u phase, v phase, and w phase are indicated by reference signs 1u, 1v, and 1w respectively. The three-phase power converter configured by these single-phase power converters 1u, 1v, and 1w is represented by a reference sign 2. It should be noted that, in FIG. 7, since the circuit structures of the single-phase power converters 1v and 1w are the same as those of the single-phase power converter 1u, the specific descriptions of the circuit structures are omitted. While the following will mainly describe the u phase, the same can be applied to the v phase and w phase. Further, in the seventh example, the number of unit cells is, but not limited to, four per arm, eight per phase, and therefore 24 in the three-phase power converter 2 as an example.

In the three-phase power converter 2 according to the sixth aspect, each phase of the three-phase transformer 24 that includes a star connection on the primary side and an open star connection on the secondary side is configured using the transformer 14 in each of the single-phase power converters 1u, 1v, and 1w that are provided respectively for u phase, v phase, and w phase. As an example, the winding number ratio of the primary side winding and the secondary side winding $N_1:N_2$ is defined as 1:1. FIG. 8A shows the star connection on the primary side of the three-phase transformer 24; FIG. 8B shows the open star connection on the secondary side of the three-phase transformer 24. As depicted in FIG. 8B, the terminal number of the secondary side winding that forms the open star connection is originally nine. However, in the sixth example, as depicted in FIG. 7, the necessary terminal number can be lowered to seven by configuring, as a single common terminal, the intermediate terminals in the three-terminal coupling reactors of the arm coupling units 13 of respective phases u, v, and w.

As described with reference to FIG. 1, in the single-phase power converter 1, the third terminal c of the arm coupling unit 13 is connected to the anode-side terminal of the DC power converter $V_{dc}$, and the intermediate terminal T2-3 of the transformer 14 is connected to the cathode-side terminal of the DC power supply $V_{dc}$. On the other hand, in the sixth example, the DC power supply $V_{dc}$ that is connected as described above in the single-phase power converter 1 in FIG. 1 is commonly used among the phases u, v, and w as depicted in FIG. 7.

Next, the following will describe a control of the DC capacitor in each unit cell of the three-phase power converter according to the sixth example with reference to FIGS. 9A to 9D, 10, and 11. FIGS. 9A to 9D are control block diagrams of the DC capacitor control of the three-phase power converter according to the sixth example. FIG. 10 is a block diagram depicting the DC capacitor control device of the three-phase power converter according to the sixth example. As described above, the three-phase power converter according to the sixth example is configured by including the single-phase power converter of the first example for three phases. It should be noted that, while the block diagrams depicted in FIGS. 9A to 9D and 10 depict the DC capacitor control of the u-phase single-phase power converter (the single-phase power converter of the first example) of the three-phase power converter, the same can be applied to the single-phase power converters 1v and 1w of the v phase and w phase, and the three-phase power converter may also be configured by the single-phase power converter according to the second to fifth examples. Further, for the same reason, the DC capacitor control of the three-phase power converter as will be described below can be applied as the DC capacitor control of the single-phase power converter alone according to the first to fifth examples.

Figure 9A:
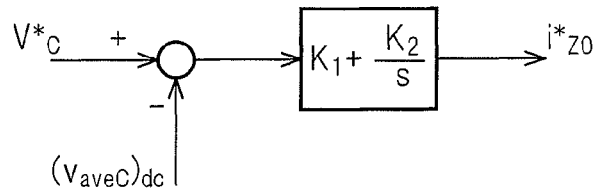
FIG. 9A is a control block diagram (Part 1) of the DC capacitor control of the three-phase power converter according to the sixth example.
Figure 9B:
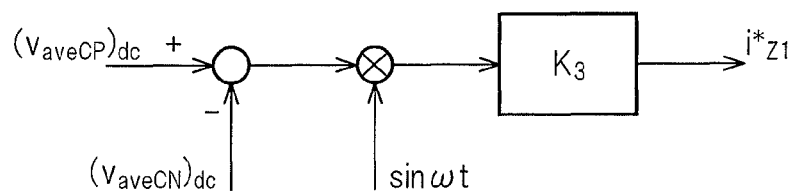
FIG. 9B is a control block diagram (Part 2) of the DC capacitor control of the three-phase power converter according to the sixth example.
Figure 9C:
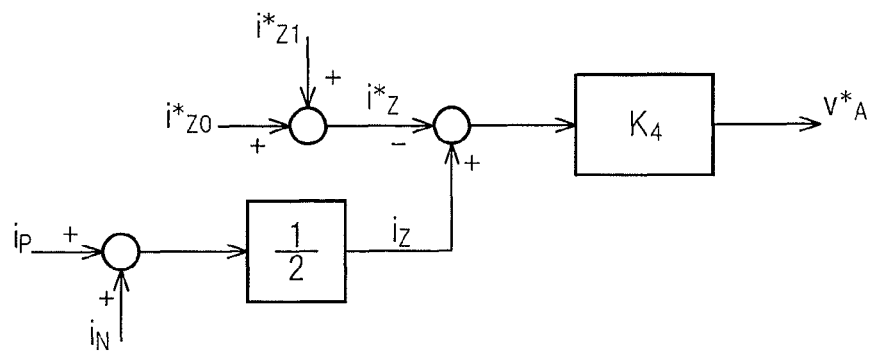
FIG. 9C is a control block diagram (Part 3) of the DC capacitor control of the three-phase power converter according to the sixth example.
Figure 9D:
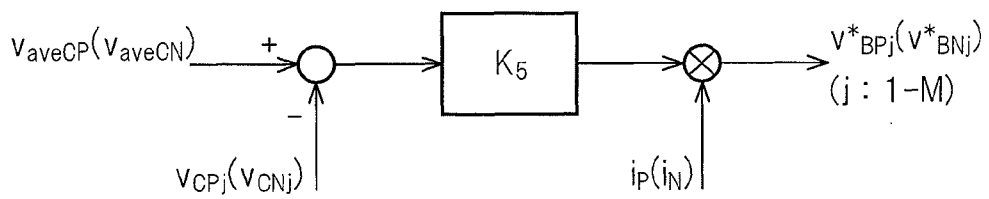
FIG. 9D is a control block diagram (Part 4) of the DC capacitor control of the three-phase power converter according to the sixth example.

According to the sixth example, as depicted in FIGS. 9A to 9D, the DC capacitor control of the three-phase power converter is mainly divided into the following four controls: first, a control depicted in FIG. 9A that makes the voltage value of each DC capacitor follow a value obtained by averaging the voltage values of all the DC capacitors in each arm (hereinafter referred to as 'averaging control'); second, a control depicted in FIG. 9B that controls so that the average value of the voltages of all the DC capacitors in the first arm and the average value of the voltages of all the DC capacitors in the second arm become equal (hereinafter referred to as 'arm-balancing control'); third, a control depicted in FIG. 9C that makes the circulating current that is half of the total of the current that flows in the first arm and the current that flows in the second arm follow the circulating current command value generated by the averaging control and arm-balancing control (hereinafter referred to as 'circulating current control'); and, fourth, a control depicted in FIG. 9D that makes the voltage value of each DC capacitor in an arm follow the value obtained by averaging the voltage values of all the DC capacitors in the same arm, which control is executed for each arm (hereinafter referred to as 'individual balance control').

The above four controls are executed by the DC capacitor control device 50 of the three-phase power converter as depicted in FIG. 10. The DC capacitor control device 50 includes: a command value generator 51 that generates a circulating current command value $i_z$* based on the voltage value of the DC capacitor in the first arm 1-P and the voltage value of the DC capacitor in the second arm 12-N; and a controller 52 that controls to make the circulating current $i_z$ that is half of the total of the arm current $i_P$ that flows in the first arm 12-P and the arm current $i_N$ that flows in the second arm 12-N follow the circulating current command value. The command value generator 51 includes: a DC component generator 61; and a fundamental wave component generator 62, while the command value generator 51 may include only the DC component generator 61. The controller 52 includes a switching commander 63 that causes the semiconductor switches to perform switching operation according to the above-described follow control. Each function is realized using a processor, such as Digital Signal Processor (DSP), Field Programmable Gate Array (FPGA), and the like.

The following will describe each of the above four controls depicted in FIGS. 9A to 9D with reference to FIG. 10.

FIG. 9A is a block diagram depicting the averaging control that makes the voltage value of each DC capacitor follow a value obtained by averaging the voltage values of all the DC capacitors in each arm. The averaging control depicted in FIG. 9A configures a feedback loop that makes the value $v_{aveC}$ obtained by averaging the voltage values of all the DC capacitors in the first arm 12-P and the second arm 12-N follow a predetermined DC voltage command value $V_C$* by generating a DC component $i_{Z0}$* of the circulating current command value by the DC component generation unit 61 in the command value generator 51 of the DC capacitor control device 50 depicted in 10. In other words, as depicted in FIG. 10, using the value $v_{aveC}$ obtained by averaging the voltage values of all the DC capacitors in the first arm 12-P and the second arm 12-N, the DC component generation unit 61 in the command value generator 51 generates a DC component $i_{Z0}$* of the circulating current command value for controlling to make the value $v_{aveC}$ obtained by averaging the voltage values of all DC capacitors in the first arm 12-P and the second arm 12-N follow a predetermined DC voltage command value $V_C$*. The following will describe the process in detail using formulas.

The value $v_{aveCP}$ obtained by averaging the voltage values $v_{CPj}$ of all the DC capacitors in the first arm 12-P and the value $v_{aveCN}$ obtained by averaging the voltage values $v_{CNj}$ of all the DC capacitors in the second arm 12-N can be expressed by formulas 21 and 22. When M is the number of unit cells in an arm, j=1 to M is defined.

[formula 21]
$$V_{aveCP} = \frac{1}{M} \sum_{j=1}^{M} V_{CPj} \quad (21)$$

[formula 22]
$$V_{aveCN} = \frac{1}{M} \sum_{j=1}^{M} V_{CNj} \quad (22)$$

Based on formulas 21 and 22, the value $v_{aveC}$ obtained by averaging the voltage values of all the DC capacitors in the first arm 12-P and the second arm 12-N can be obtained by formula 23.

[formula 23]
$$V_{aveC} = \frac{1}{2}(V_{aveCP} + V_{aveCN}) \quad (23)$$

As such, as depicted in FIG. 9A, the DC component generator 61 in the command value generator 51 depicted in FIG. 10 generates the DC component of the circulating current command value for making the DC component $(v_{aveC})_{dc}$ of the value obtained by averaging the voltage values of all DC capacitors in the first arm 12-P and the second arm 12-N that is obtained by formula 23 follow a predetermined DC voltage command value $V_C^*$.

Next, FIG. 9B is a block diagram depicting the arm-balancing control that makes the average value of the voltages of all the DC capacitors in the first arm and the average value of the voltages of all the DC capacitors in the second arm become equal. The arm-balancing control depicted in FIG. 9B controls to nullify the difference between the value $v_{aveCP}$ obtained by averaging the voltage values of all the DC capacitors in the first arm 12-P and the value $v_{aveCN}$ obtained by averaging the voltage values of all the DC capacitors in the second arm 12-N by generating a fundamental wave component $i_{Z1}^*$ of the circulating current command value by the fundamental wave component generator 62 in the command value generator 51 of the DC capacitor control unit 50 depicted in FIG. 10 and using the fundamental wave component $i_{Z1}^*$ as part of the circulating current command value.

If the fundamental wave component of the circulating current $i_Z$ that is half of the total of the arm current $i_P$ that flows in the first arm 12-P and the arm current $i_N$ that flows in the second arm 12-N (i.e., the same phase as the terminal voltage $v_{ac}$ between the AC input and output terminals) is defined as $i_{Z1}$, when the fundamental wave component $i_{Z1}$ of the circulating current $i_Z$ has the same phase as that of the terminal voltage $v_{ac}$ between the AC input and output terminals, the power transfers from the first arm 12-P to the second arm 12-N. When the fundamental wave component $i_{Z1}$ of the circulating current $i_Z$ is the reverse phase of the terminal voltage $v_{ac}$ between the AC input and output terminals, the power transfers from the second arm 12-N to the first arm 12-P. Utilizing such a characteristic, the fundamental wave component generator 62 in the command value generator 51 depicted in FIG. 10 generates a fundamental wave component $i_{Z1}^*$ of the same phase as that of the terminal voltage $v_{ac}$ between the AC input and output terminals among the circulating current command value $i_Z^s$, using a difference of the value $v_{aveCP}$ obtained by averaging the voltage values of all the DC capacitors in the first arm 12-P and the value $v_{aveCN}$ obtained by averaging the voltage values of all the DC capacitors in the second arm 12-N. In the example of FIG. 9B, the phase of the terminal voltage between the AC input and output terminals is expressed by sin ωt, and thus the circulating current command value $i_{Z1}^*$ is generated by multiplying the DC portion of the value $v_{aveCP}$ obtained by averaging the voltage values of all the DC capacitors in the first arm 12-P and the DC portion of the value $v_{aveCN}$ obtained by averaging the voltage values of all DC capacitors in the second arm 12-N by sin ωt that includes a phase parameter, and multiplying by an appropriate gain K3.

By executing such an arm-balancing control, when the value $v_{aveCP}$ obtained by averaging the voltage values of all the DC capacitors in the first arm 12-P is larger than the value $v_{aveCN}$ obtained by averaging the voltage values of all the DC capacitors in the second arm 12-N, the power transfers from the first arm 12-P to the second arm 12-N. As the result, $v_{aveCP}$ decreases, while $v_{aveCN}$ increases. In contrast, when the value $v_{aveCP}$ obtained by averaging the voltage values of all the DC capacitors in the first arm 12-P is smaller than the value $v_{aveCN}$ obtained by averaging the voltage values of all the DC capacitors in the second arm 12-N, the power transfers from the second arm 12-N to the first arm 12-P. As a result, $V_{aveCP}$ increases, while $v_{aveCN}$ decreases.

Next, FIG. 9C is a block diagram depicting the circulating current control that makes the circulating current that is half of the total of the current that flows in the first arm and the current that flows in the second arm follow the circulating current command value generated by the averaging control and arm-balancing control. The circulating current control depicted in FIG. 9C controls using the controller 52 so that the circulating current $i_Z$ that is half the total of the arm current $i_P$ that flows in the first arm 12-P and the arm current $i_N$ that flows in the second arm 12-N follow the circulating current command value $i_z^*$ that is generated by adding the DC component $i_{z0}^*$ of the circulating current command value generated by the DC component generator 61 in the command value generator 52 of the DC capacitor control device 50 depicted in FIG. 10 and the fundamental wave component $i_{Z1}^*$ of the circulating current command value generated by the fundamental wave component generator 62 in the command value generator 52 thereof. The controller 52 generates a voltage command value $v_A^*$ for configuring a feedback loop for making the circulating current $i_Z$ follow the circulating current command value $i_z^*$.

It should be noted that, while, as described above, the command value generator 51 includes the DC component generator 61 and the fundamental wave component generator 62, the command value generator 51 may include only the DC component generator 61. In such a case, the DC component $i_{Z0}^*$ of the circulating current command value generated by the DC component generation unit 61 is utilized as is by the controller 52 as the circulating current command value $i_z^*$.

Next, FIG. 9D is a block diagram depicting the individual balance control that makes the voltage value of each DC capacitor in an arm follow the value obtained by averaging the voltage values of all the DC capacitors in the same arm. The individual balance control is performed for each arm. FIG. 9D shows mainly the individual balance control of the first arm 12-P, while the individual balance control of the second arm 12-N is indicated in parentheses '( )'. The controller 52 performs a control to make the voltage value $v_{CPj}$ of each DC capacitor in the first arm 12-P follow the value $V_{aveCP}$ obtained by averaging the voltage values of all the DC capacitors in the first arm 12-P and a control to make the voltage value $V_{CNj}$ of each DC capacitor in the second arm 12-N follow the value $v_{aveCN}$ obtained by averaging the voltage values of all the DC capacitors in the second arm 12-N. A voltage command value for such control is generated for each unit cell 11-j in respective arms 12-P and 12-N. Such a voltage command value for the first arm 12-P is expressed by $v_{BPj}$, and such a voltage value for the second arm 12-N is expressed by $v_{BNj}^*$. When M is the number of the unit cells in an arm, j=1 to M is defined.

By the above four controls, a voltage command value for controlling the DC capacitor in the unit cell 11-j in respective arms 12-P and 12-N is generated, and a final output voltage command value for each unit cell 11-j in respective arms 12-P and 12-N is generated as in formulas 24 and 25 by combining the voltage command value and the voltage command value $v_{ac}^*$ for the AC voltage that one phase of the three-phase power converter 2 (i.e., a single-phase power converter 1) has to output.

[formula 24]
$$V_{Pj}^* = V_A^* + V_{BPj}^* - \frac{N_2}{2N_1}\frac{v_{ac}^*}{M} + \frac{V_{dc}}{M} \quad (24)$$

[formula 25]
$$V_{Nj}^* = V_A^* + V_{BNj}^* - \frac{N_2}{2N_1}\frac{v_{ac}^*}{M} + \frac{V_{dc}}{M} \quad (25)$$

To stabilize the control, the DC voltage $V_{dc}$ is utilized as a feedforward term.

Using the output voltage command values $v_{Pj}^*$ and $v_{Nj}^*$ indicated by formulas 24 and 25, the switching operation of the semiconductor switches SW in each unit cell 11-j in the three-phase power converter 2 is controlled. As described above, the controller 52 includes a switching commander 63 that causes the semiconductor switches SW to perform switching operation. The output voltage command values $v_{Pj}^*$ and $v_{Nj}^*$ generated by respective arms 12-P and 12-N are standardized by voltages $v_{CPj}$ and $V_{CNj}$ of respective DC capacitors, then, compared with the triangular wave carrier signal of carrier frequency $f_c$ (maximum value: 1, minimum value: 0), whereby a switching signal of pulse width modulation (PWM) is generated. The generated switching signal is used by the switching controller 52 for controlling switching of the semiconductor switches SW in the corresponding unit cell 11-j. When eight unit cells per phase (four units for each arm) are used, the three-phase power converter 2 according to the sixth example makes PWM waveforms with a nine-level phase voltage and a 17-level line voltage. Generation of this switching signal is realized using a processor, such as a Digital Signal Processor (DSP), Field Programmable Gate Array (FPGA), and the like.

Next, the response results of the instantaneous effective power control and instantaneous reactive power control in simulations of the three-phase power converter 2 according to the sixth example will be described. The circuit parameters depicted in Table 1 are used in the simulations.

TABLE 1

| Circuit Parameters Used in Simulation | | |
|---|---|---|
| Rated capacity | | 1 MVA |
| Rated line voltage effective value | $V_s$ | 6.6 kV |
| Rated current effective value | I | 87 A |
| System frequency | f | 50 Hz |
| DC link voltage | $V_{dc}$ | 2.8 kV/5.6 kV |
| Coupled inductor | L | 14 mH |
| DC voltage command value | Vc* | 1.4 kV |
| DC capacitor | C | 3.3 mF |
| Carrier frequency | $f_c$ | 2 kHz |
| AC side interconnection reactor | $L_s$ | 7 mH |

'PSCAD®/EMTDC™' software is used for the simulation. As for a simulation circuit, an analogue control system with zero control delay is assumed, and an ideal switch with zero dead time is used. As depicted in FIG. 7, four unit cells are provided for respective arms 12-P and 12-N in one phase of the three-phase power converter 2 (i.e., a single-phase power converter 1), thus, 24 unit cells are provided in the three-phase power converter 2 as a whole. The DC link units of the converters 1u, 1v, and 1w of respective phases u, v, and w are commonly connected to a DC power supply $V_{dc}$ (2.8 kV). The AC side of the three-phase power converter 2 is connected to the three-phase AC power supply of 6.6 kV, 1 MVA, and 50 Hz through an interconnection reactor L.

The three-phase transformer 24 includes the star connection on the primary side and the open star connection on the secondary side as depicted in FIGS. 8A and 8B.

Figure 11:
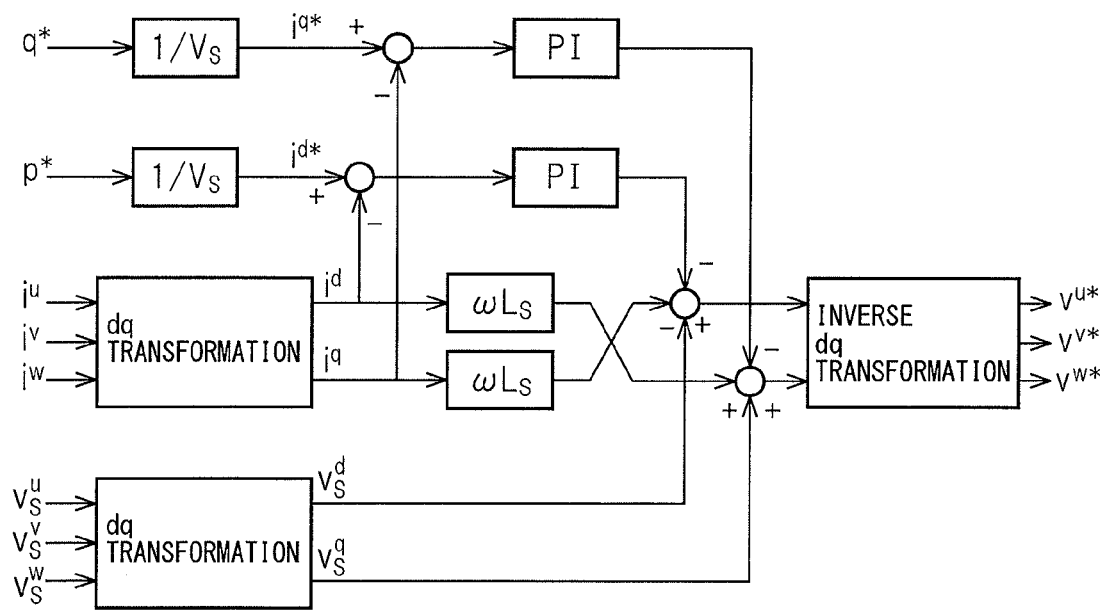
FIG. 11 is a block diagram depicting the instantaneous effective power control and instantaneous reactive power control in a simulation of the three-phase power converter according to the sixth example.

FIG. 11 is a block diagram depicting the instantaneous effective power control and instantaneous reactive power control in a simulation of the three-phase power converter according to the sixth example. The instantaneous effective power command value is expressed by p*, and the instantaneous reactive power command value is expressed by q*. The phase voltage command values $v^{u*}$, $v^{v*}$ and $v^{w*}$ of the three-phase power converter 2 according to the sixth example are determined by non-interactive control of the power currents $i^u$, $i^v$ and $i^w$ of respective phases. Based on formulas 14 and 15, the power currents of respective phases $i^u$, $i^v$ and $i^w$ can be calculated by formulas 26, 27, and 28 using the arm currents $i^u_P$, $i^v_P$, and $i^w_P$ that flow in the first arm 12-P and the arm currents $i^u_N$, $i^v_N$, and $i^w_N$ that flow in the second arm 12-N.

[formula 26]
$$i^u = \frac{N_2}{2N_1}(i_N^u - i_P^u) \quad (26)$$

[formula 27]
$$i^v = \frac{N_2}{2N_1}(i_N^v - i_P^v) \quad (27)$$

[formula 28]
$$i^w = \frac{N_2}{2N_1}(i_N^w - i_P^w) \quad (28)$$

Figure 12:
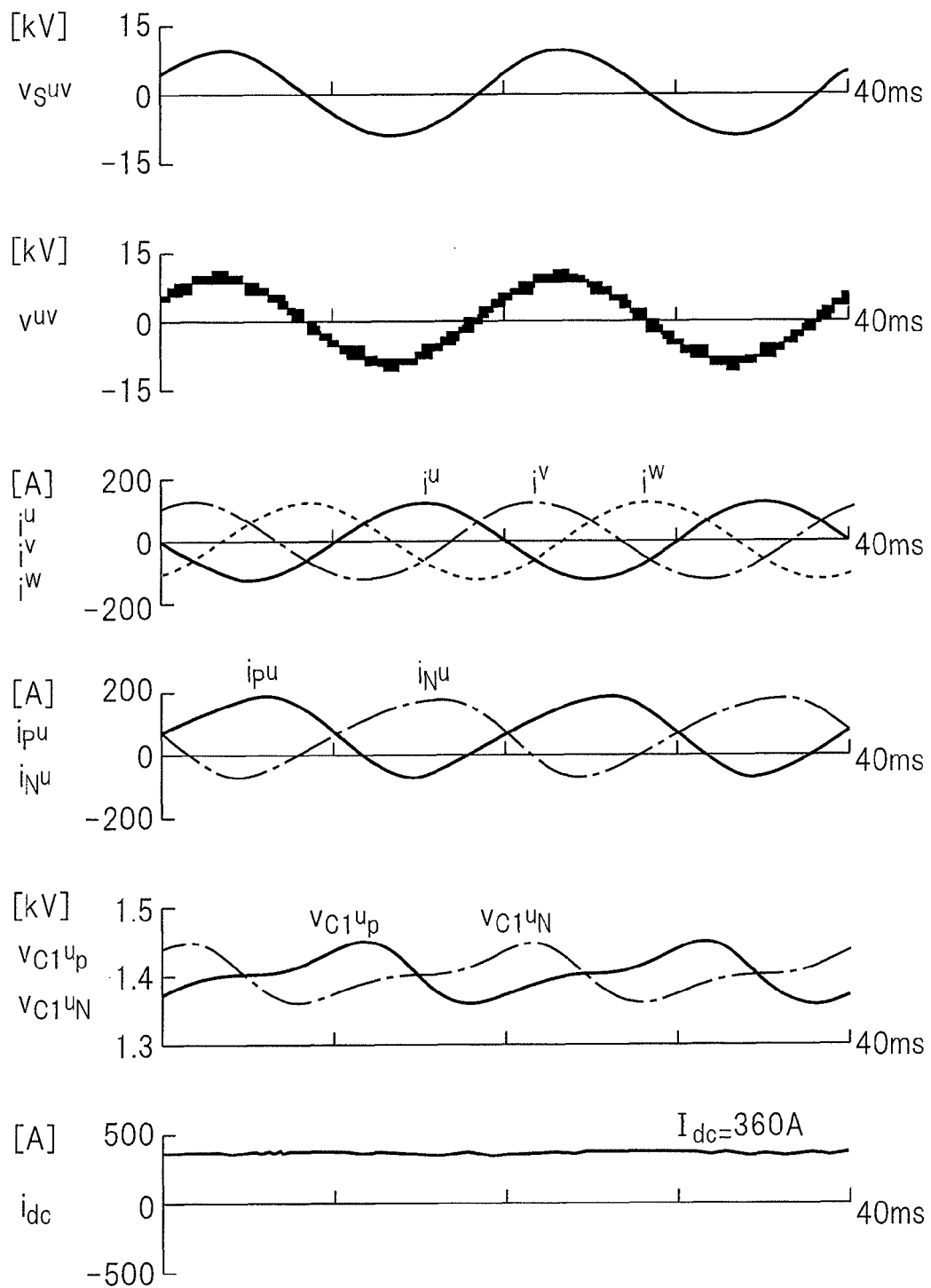
FIG. 12 is a diagram depicting simulated waveforms that have stationary characteristics when the three-phase power converter performs inverter operation according to the sixth example.

FIG. 12 is a diagram depicting simulated waveforms that have stationary characteristics when the three-phase power converter according to the sixth example performs inverter operation. The uppermost graph of FIG. 12 shows a waveform of a line voltage $v_s^{uv}$ between the u and v phases of the three-phase AC power supply of 6.6 kV, 1 MVA, 50 Hz that is connected to the AC side of the three-phase power converter 2 through the interconnection reactor $L_s$. When the three-phase power converter 2 performs inverter operation (cos φ=−1), the uv-phase voltage $v^{uv}$ on the AC side of the three-phase power converter 2 forms a multilevel waveform of 17 levels (the second graph from the top in FIG. 12), which shows that the influence from harmonic voltages is small. The phase of the power current $i^u$ (the third graph from the top in FIG. 12) is reversed by 180 degrees with respect to the u phase voltage $v^u_s$ of the three-phase AC power supply that is connected to the three-phase power converter 2 through the interconnection reactor $L_s$, which shows that the inverter operation is realized.

With regard to u phase, the arm current $i^u_P$ that flows in the first arm 12-P and the arm current $i^u_N$ that flows in the second arm 12-N (the fourth graph from the top in FIG. 12) each include a DC component and a switching ripple component of 8 kHz (=2 kHz×4) in addition to the fundamental wave component of 50 Hz. Based on the formulas 14 and 15, the amplitude of the fundamental wave component is equal to the amplitude of the power current. On the other hand, formula 29 is derived from the relation of the average power on the DC side of the three-phase power converter 2.

[formula 29]
$$P = V_{dc}I_{dc} = 6V_{dc}I_Z^u \quad (29)$$

When formula 29 is substituted in formulas 14 and 15, formulas 30 and 31 can be obtained.

[formula 30]
$$i_P^u = \frac{P}{6V_{dc}} - \frac{N_1}{N_2} i^u \quad (30)$$

[formula 31]
$$i_N^u = \frac{P}{6V_{dc}} + \frac{N_1}{N_2} i^u \quad (31)$$

When P=1 MW, $V_{dc}$=2.8 kV are substituted in the formulas 30 and 31, the power current $i_{dc}$ becomes 60 A. This result matches the simulation result of the fourth graph from the top in FIG. 12.

Further, as depicted in the fifth graph from the top in FIG. 12, it can be seen that the voltage values $V_{C1}{}^u{}_P$ and $V_{C1}{}^u{}_N$ of the DC capacitors in the unit cells 11-1 in the first arm 12-A and the second arm 12-N of u phase are controlled to be 1.4 kV for the DC component. Further, the DC component $I_{dc}$ of the direct current $i_{dc}$ becomes 360 A. This result matches the simulation result of the sixth graph from the top in FIG. 12.

Figure 13:
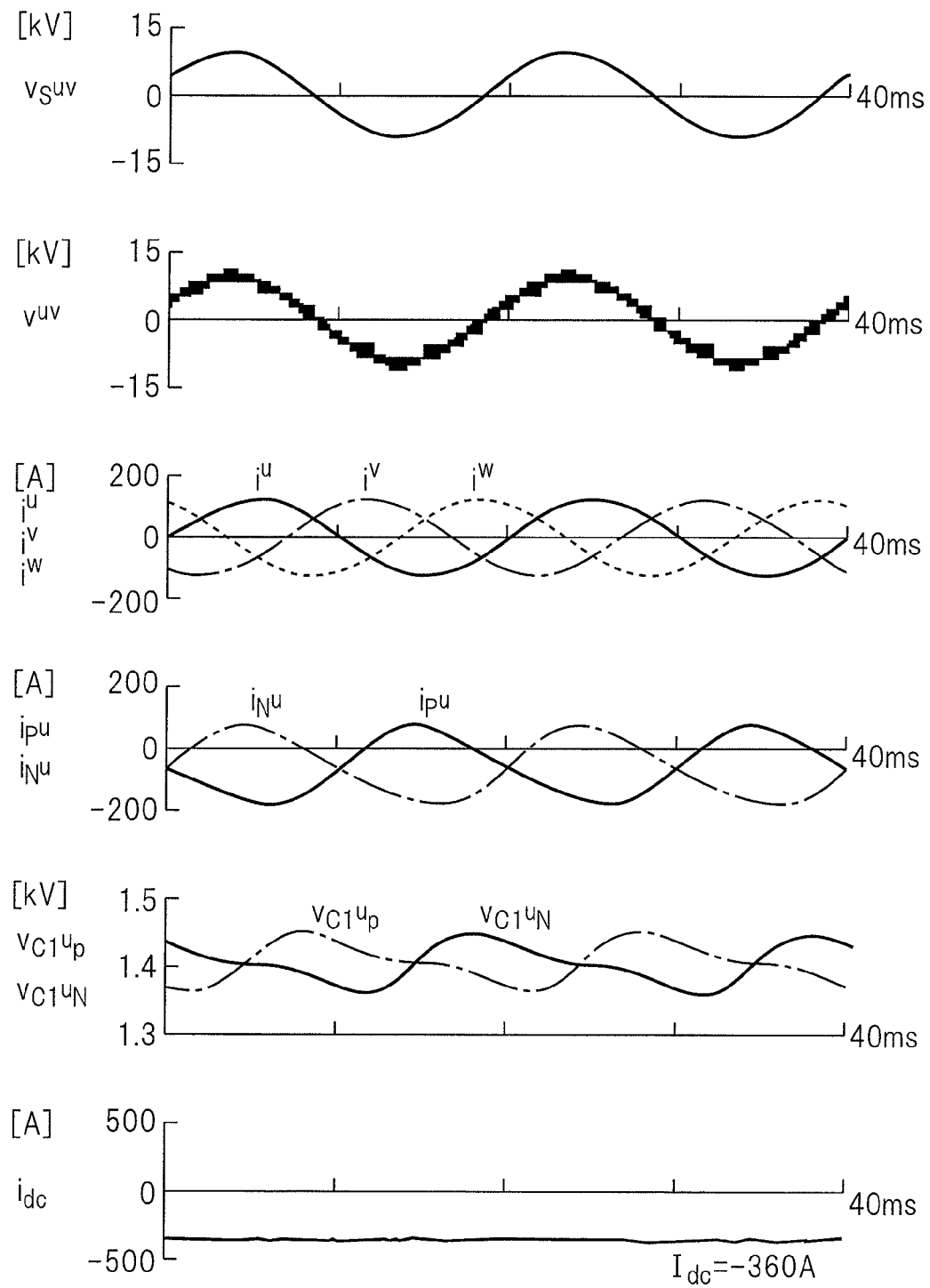
FIG. 13 is a diagram depicting simulated waveforms that have stationary characteristics when the three-phase power converter performs rectifying operation according to the sixth example.

FIG. 13 is a diagram depicting simulated waveforms that have stationary characteristics when the three-phase power converter according to the sixth example performs rectifying operation. The uppermost graph of FIG. 13 depicts a waveform of a line voltage $v_{Suv}$ across the u and v phases of the three-phase AC power supply of 6.6 kV, 1 MVA, 50 Hz that is connected to the AC side of the three-phase power converter 2 through the interconnection reactor $L_s$. When the three-phase power converter 2 performs the rectifying operation (cos φ=1), the power current $i^u$ (the third graph from the top in FIG. 13) is the same phase as the u phase voltage $v^u{}_S$ of the three-phase AC power supply that is connected to the three-phase power converter 2 through the interconnection reactor $L_s$, which shows that the rectifying operation is realized. It can be seen that the waveforms depicted in the fourth to sixth graphs from the top in FIG. 13 have a tendency similar to the case of the inverter operation depicted in the fifth to seventh graphs from the top in FIG. 12. Further, as indicated in the sixth graph from the top in FIG. 13, the DC component $I_{dc}$ of the direct current $i_{dc}$ is −360 A.

Next, a comparison will be made between: the single-phase power converter according to the first example and the three-phase power converter according to the sixth example; and the modular multilevel cascade converters (MMCC) described in Patent Literature 1 and Non-Patent Literature 1 to 4.

Figure 14:
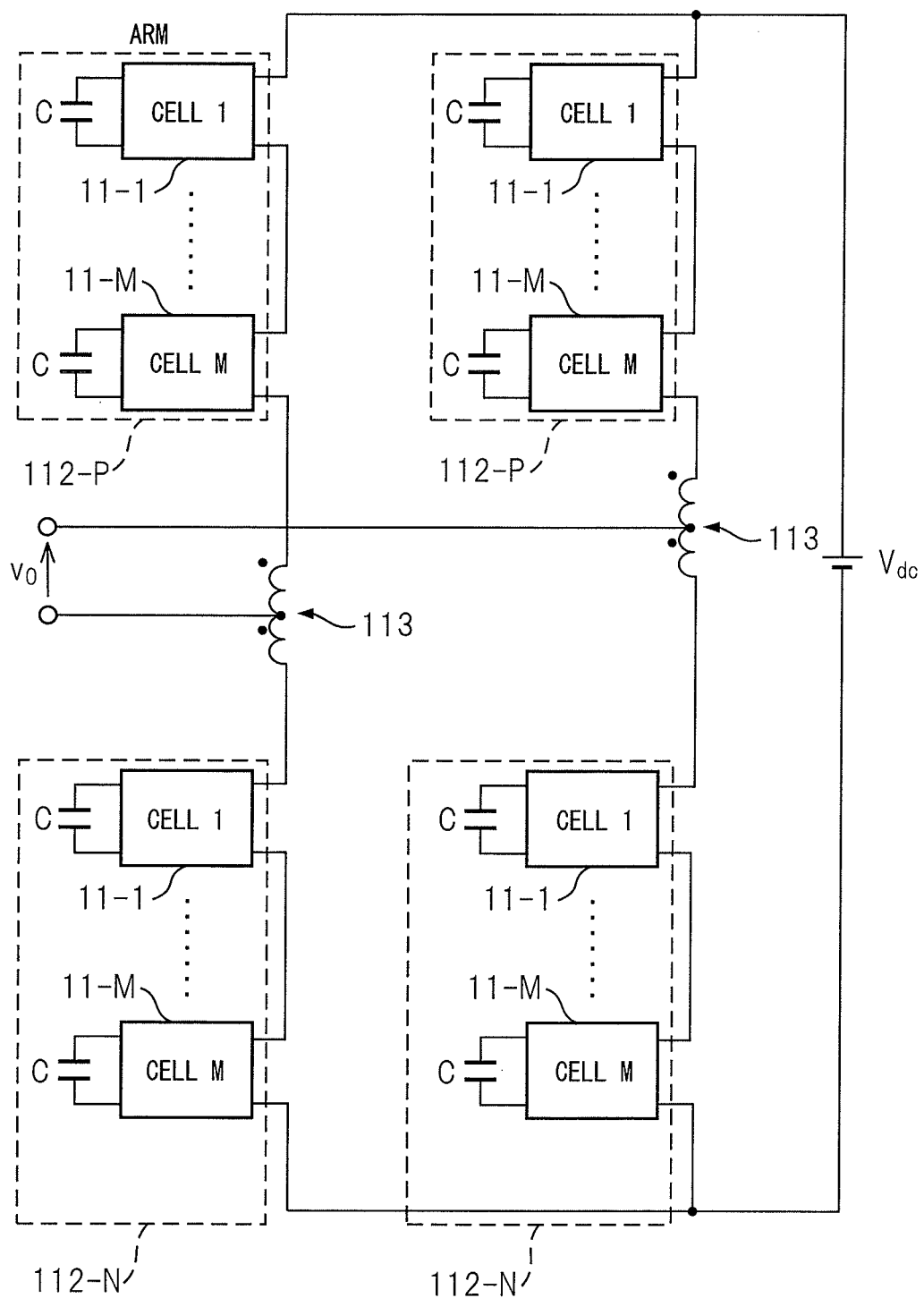
FIG. 14 is a circuit diagram depicting a conventional single-phase modular multilevel cascade converter.
Figure 15A:
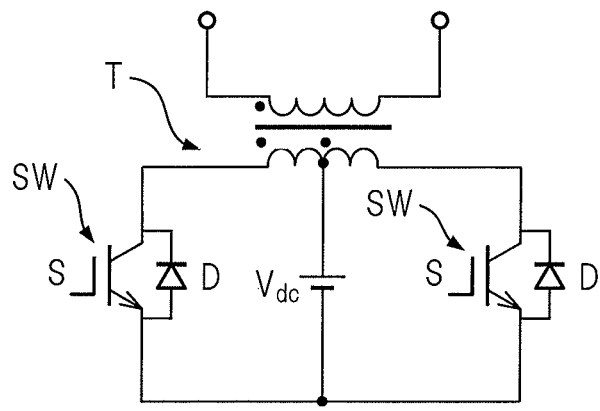
FIG. 15A is a circuit diagram illustrating a comparison between a push-pull inverter and a full bridge inverter, and also depicts the push-pull inverter.
Figure 15B:
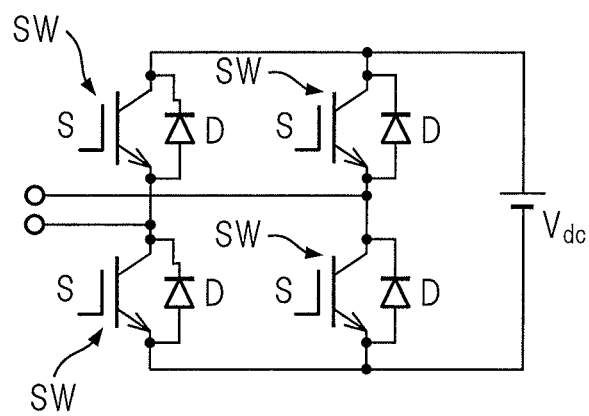
FIG. 15B is a circuit diagram illustrating a comparison between the push-pull inverter and the full bridge inverter, and also depicts the full bridge inverter.

FIG. 14 is a circuit diagram depicting a conventional single-phase modular multilevel cascade converter. FIGS. 15A and 15B are circuit diagrams illustrating a comparison between a push-pull inverter and a full bridge inverter. FIG. 15A shows a push-pull inverter and FIG. 15B shows a full bridge inverter. The conventional modular multilevel cascade converter depicted in FIG. 14 is equivalent to the one depicted in FIG. 15B with the switch elements SW of the full bridge inverter replaced with the unit cells 11-1 to 11-M described with reference to FIGS. 2A and 2B. In contrast, as described with reference to FIG. 1, the single-phase power converter 1 according to the first example depicted in FIG. 1, in which the switch elements SW of the push-pull inverter depicted in FIG. 15A are replaced with the unit cells 11-1 to 11-M described with reference to FIGS. 2A and 2B, uses the three-terminal coupling reactor as the arm coupling unit 13.

As depicted in FIG. 14, the conventional single-phase modular multilevel cascade converter is configured by arms 112-P and 112-N in which unit cells 11-j are cascade-connected to one another, and a three-terminal coupling reactor 113. It should be noted that DC capacitors C in the unit cells 11-1 to 11-M of FIG. 14 are also described outside of the chopper cells 11-1 to 11-M in the same way as other drawings for the convenience of understanding.

Figure 16:
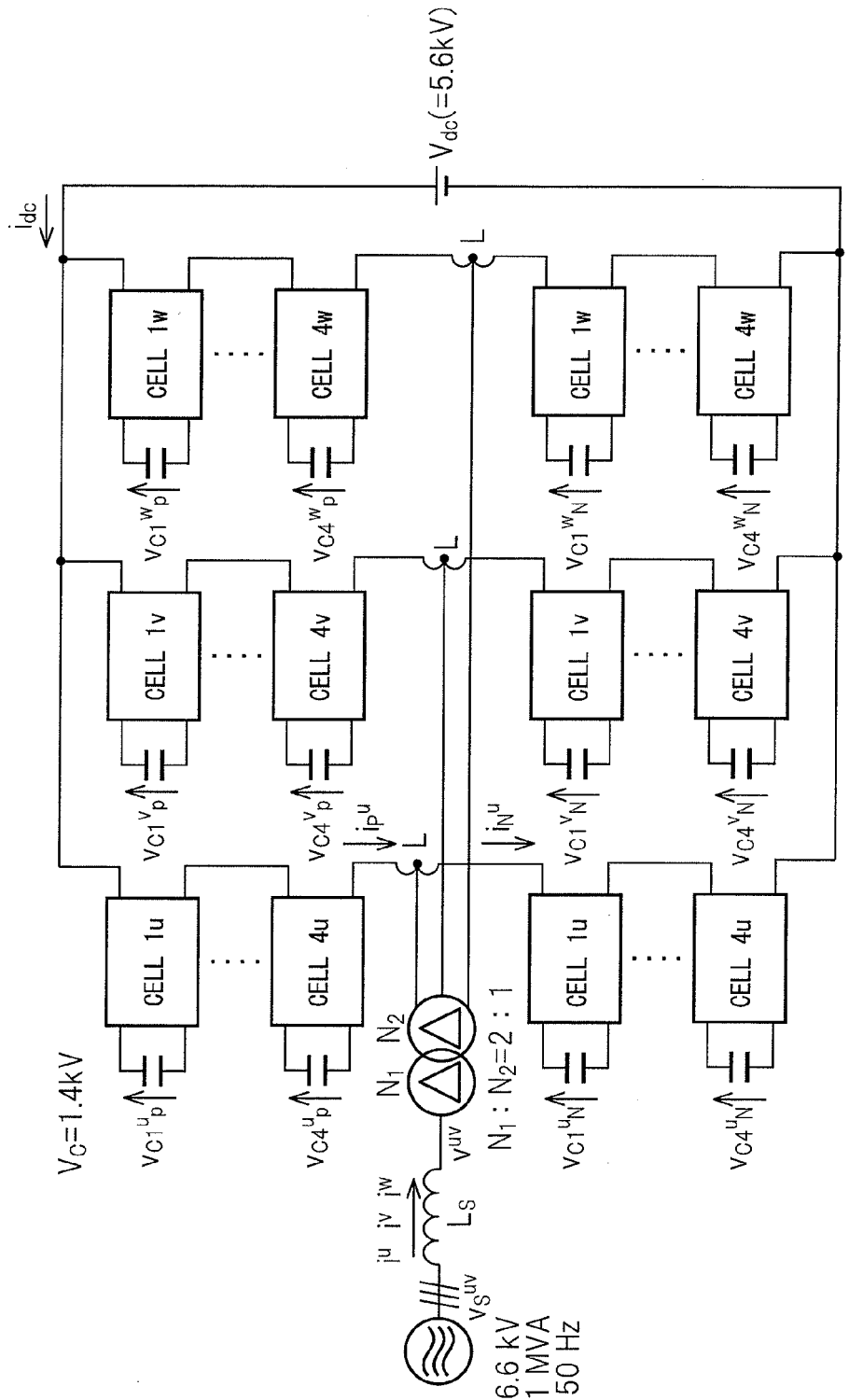
FIG. 16 is a circuit diagram depicting a conventional three-phase modular multilevel cascade converter.

FIG. 16 is a circuit diagram depicting a conventional three-phase modular multilevel cascade converter. The three-phase modular multilevel cascade converter is configured by preparing three phases of the single-phase modular multilevel cascade converter of FIG. 14, and connecting each single-phase modular multilevel cascade converter to each phase on the secondary side of the interconnection transformer.

The operation of the three-phase power converter according to the sixth example depicted in FIG. 7 and the operation of the conventional three-phase modular multilevel cascade converter depicted in FIG. 16 are compared in simulations as follows. In the simulations of the conventional three-phase modular multilevel cascade converter depicted in FIG. 16, the same parameters are used as those of the three-phase power converter according to the sixth example as described with reference to FIGS. 11 to 13 and Table 1. Further, in comparing the simulations, the DC capacitor voltage in each unit cell of the three-phase power converter according to the sixth example and the DC capacitor voltage in each unit cell of the conventional three-phase modular multilevel cascade converter depicted in FIG. 16 are the same ($V_c$=1.4 kV); the total number of the unit cells in each converter is the same (24 units); and the voltage of each unit cell and the rated current thereof are the same. When the DC capacitor voltages in the unit cells of each converter are the same, the voltage ratings of the semiconductor switching elements become the same. To equalize the current ratings, the arm currents of each converter should be the same. In FIG. 16, respective arm currents of the conventional three-phase modular multilevel cascade converter can be expressed by formulas 32 and 33.

[formula 32]
$$i_P^u = \frac{P}{3V_{dc}} - \frac{N_1}{2N_2} i^u \quad (32)$$

[formula 33]
$$i_N^u = \frac{P}{3V_{dc}} + \frac{N_1}{2N_2} i^u \quad (33)$$

To make the arm currents the same between the three-phase power converter according to the sixth example depicted in FIG. 7 and the conventional three-phase modular multilevel cascade converter depicted in FIG. 16 in order to equalize the current ratings for comparison, based on formulas 30 to 33, for the DC voltages $V_{dc}$, the conventional three-phase modular multilevel cascade converter depicted in FIG. 16 is 5.6 kV that is twice as large as the DC voltage 2.8 kV of the three-phase power converter of the sixth example depicted in FIG. 7. Further, secondly, for the winding number ratio $N_1$:$N_2$ of the transformer, while the three-phase power converter of the sixth example depicted in FIG. 7 is 1:1, the conventional three-phase modular multilevel cascade converter depicted in FIG. 16 is set as 2:1. Therefore, the parameters used in the simulation of the conventional three-phase modular multilevel cascade converter are the same as Table 1 except that the DC power supply $V_{dc}$ is set as 5.6 kV and that the winding number ratio of the three-phase transformer $N_1:N_2$ is set as 2:1.

Figure 17:
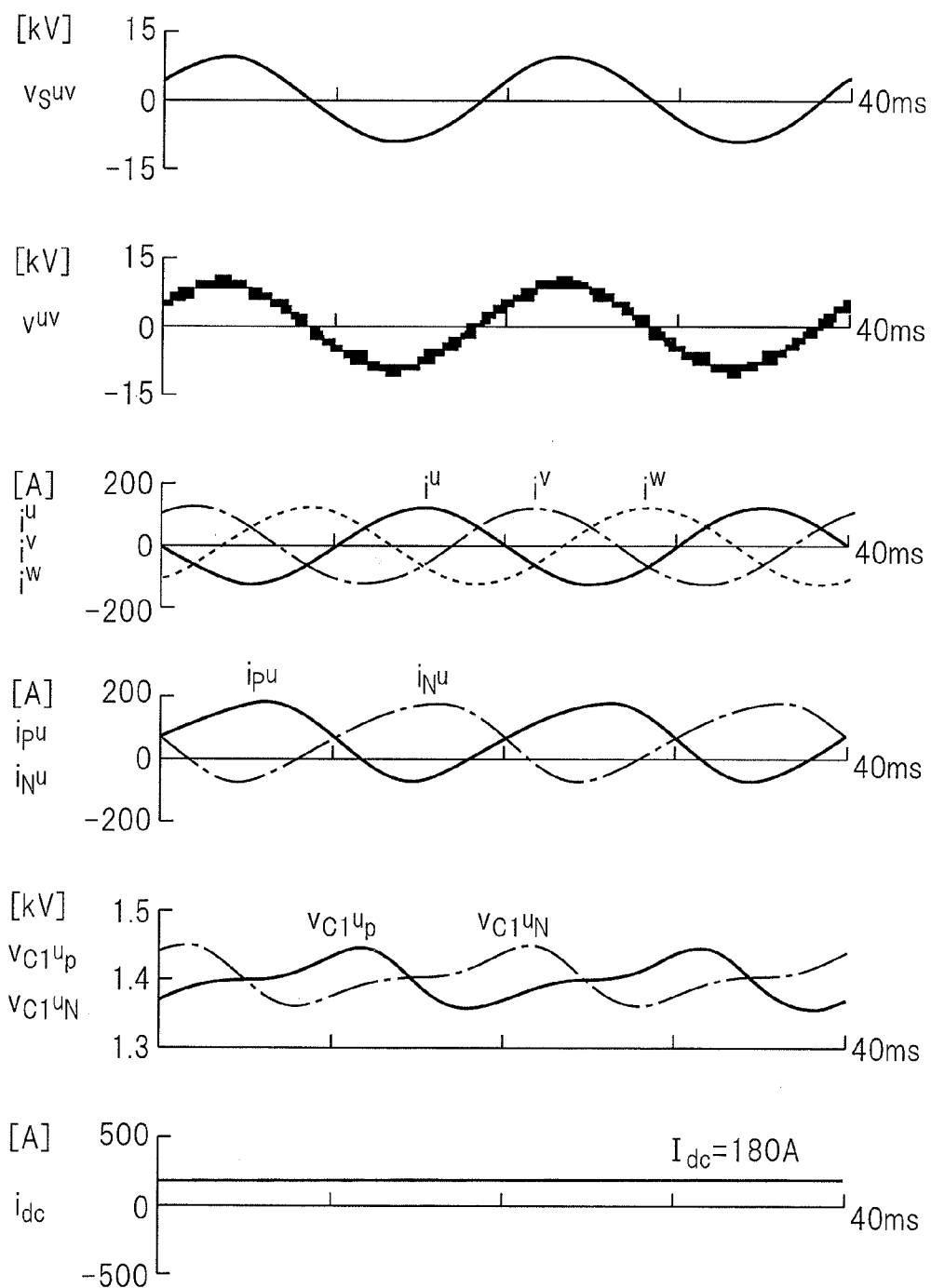
FIG. 17 is a diagram depicting simulated waveforms that have stationary characteristics when the three-phase modular multilevel cascade converter depicted in FIG. 16 performs an inverter operation.

FIG. 17 is a diagram depicting the simulated waveforms that have stationary characteristics when the conventional three-phase modular multilevel cascade converter depicted in FIG. 16 performs inverter operation. The uppermost graph of FIG. 17 depicts a waveform of line voltage $V_{Suv}$ across the u and v phases of the three-phase AC power supply of 6.6 kV, 1 MVA, 50 Hz that is connected to the AC side of the conventional three-phase modular multilevel cascade converter through the interconnection reactor $L_s$. When the modular multilevel cascade converter performs inverter operation (cos φ=−1), the waveforms are the same as those of FIG. 12 except for the power current $i_{dc}$. The effective value $i_{dc}$ of the power current $i_{dc}$ depicted in the sixth graph from the top in FIG. 17 is 180 A (1 MW/5.6 kV) that is half the value of the case of the three-phase power converter according to the sixth example depicted in the sixth graph from the top in FIG. 12. From the comparison between FIGS. 12 and 17, the three-phase power converter of the sixth example and the conventional three-phase modular multilevel cascade converter are considered to have equivalent capabilities. On the other hand, the power current $i_{dc}$ of the three-phase power converter of the sixth example is sufficient with half the one of the conventional three-phase modular multilevel cascade converter.

According to the comparison result based on the above simulation, the three-phase power converter according to the sixth example can be interconnected to the system with half the DC voltage compared with the conventional three-phase modular multilevel cascade converter. Therefore, the three-phase power converter includes superior points: of being suitable for use in a battery energy storage device that has low voltage and large current on the DC side, and an insulation structure on the DC side can be easily constructed. In particular, by realizing the interconnection with half the DC voltage, the following advantages can be obtained: First, in principle, as a characteristic of an assembled battery, the reliability becomes higher as the voltage is lower. The present invention offers an advantage of high reliability as a result of the interconnection being realized with half of the DC voltage. Secondly, there is an advantage in that, since the DC voltage is lower, applicability to existing techniques increases. Specifically, if the DC voltage level is lowered from 1500V to 750V by application of the present invention, the voltage level becomes closer to the low voltage electric equipment field wherein various existing techniques can be used. Thus, the applicability of existing techniques increase, offering advantages in terms of enhancing reliability and facilitating easier protection and insulation. For example, in a high voltage region of 2000V or more, the fields of application are limited, and thus there are problems in that: reliability is lowered; protection and insulation are difficult; and components such as voltage sensors and capacitors are expensive. These problems can be avoided by realizing an interconnection with half the DC voltage by application of the present invention.

Figure 18:
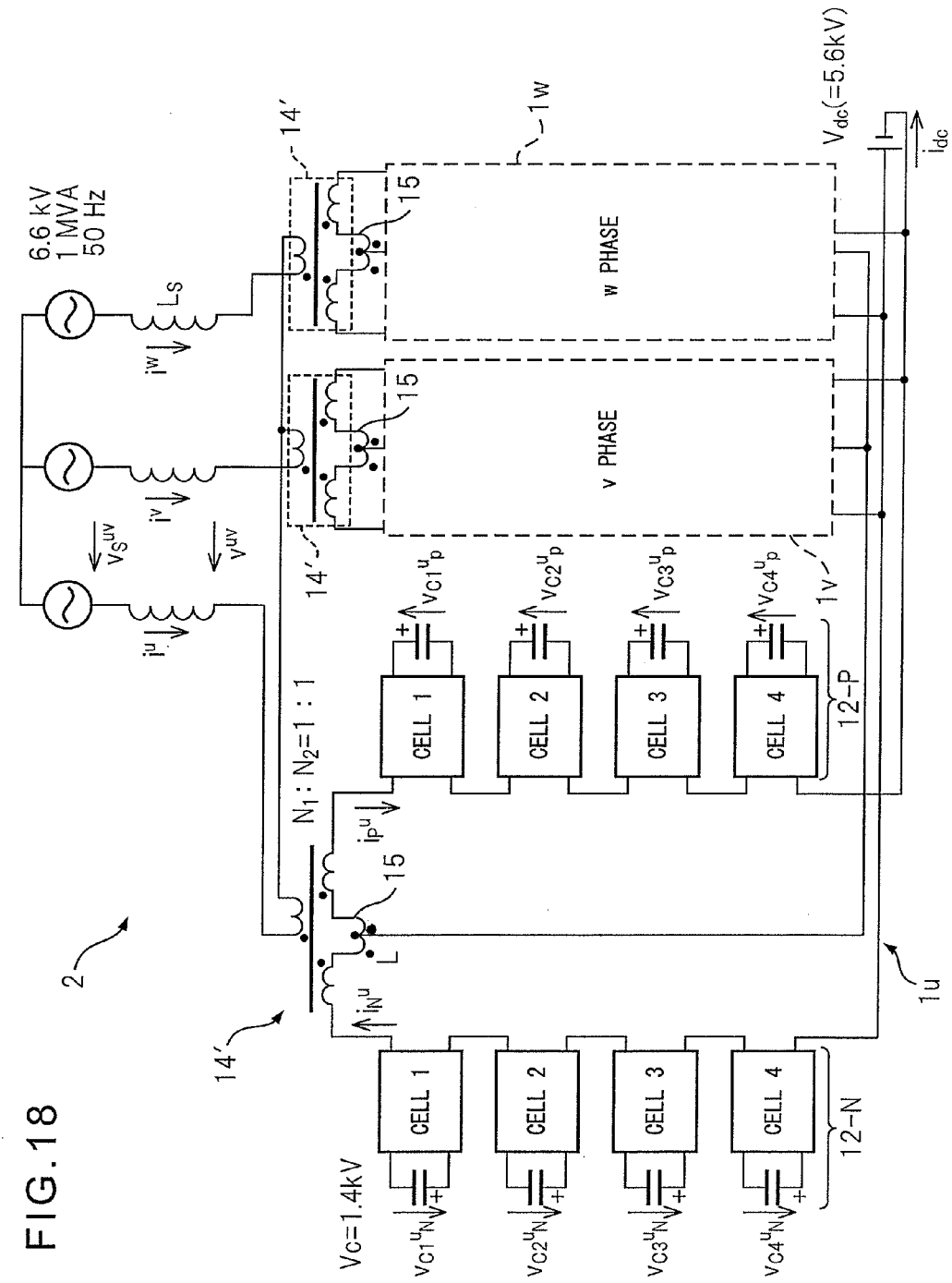
FIG. 18 is a circuit diagram depicting a three-phase power converter according to the seventh example.

FIG. 18 is a circuit diagram depicting the three-phase power converter according to the seventh example. In the seventh example, the three-phase power converter is configured using the single-phase power converter according to the fifth example as described with reference to FIG. 6. In FIG. 18, the single-phase power converters provided for u phase, v phase, and w phase are indicated by reference signs 1u, 1v, and 1w respectively. The three-phase power converter configured by these single-phase power converters 1u, 1v, and 1w is expressed by a reference sign 2. It should be noted that, in FIG. 18, as the circuit components of the single-phase power converters 1v, 1w are the same as the single-phase power converter 1u, specific descriptions of the circuit components are omitted. While the following will mainly describe the u phase, the same can be applied to the v phase and w phase. Further, while, in the seventh example, the number of unit cells is, but not limited to four per arm, eight per phase, and therefore 24 in the three-phase power converter 2 as an example.

As described with reference to FIG. 6, in the transformer 14' according to the fifth example, a three-terminal coupling reactor 15 is provided at the position where the intermediate terminal of the transformer 14 was located in the single-phase power converter 1 of the first example as described with reference to FIG. 1. Thus, the three-terminal coupling reactor 15 is located on the secondary side winding of the transformer 14'. In the three-phase power converter 2 according to the seventh example, each phase of the three-phase transformer 24 is configured using transformer 14'.

As described with reference to FIG. 6, the DC power supply $V_{dc}$ according to the fifth example is connected between the lower side terminal of the first arm 12-P and the lower side terminal of the second arm 12-N. In the seventh example, the DC power supply $V_{dc}$ that was connected as described above in the single-phase power converter 1 in FIG. 6 is now commonly used among the phases u, v, and w as depicted in FIG. 18, provided, however, that the voltage value is twice as large as the one of the fifth example depicted in FIG. 6. By Y-connecting the intermediate terminal (a center tap) of the three-terminal coupling reactor 15, the voltage dividing capacitor included in the fifth example depicted in FIG. 6 can be eliminated.

Figure 19:
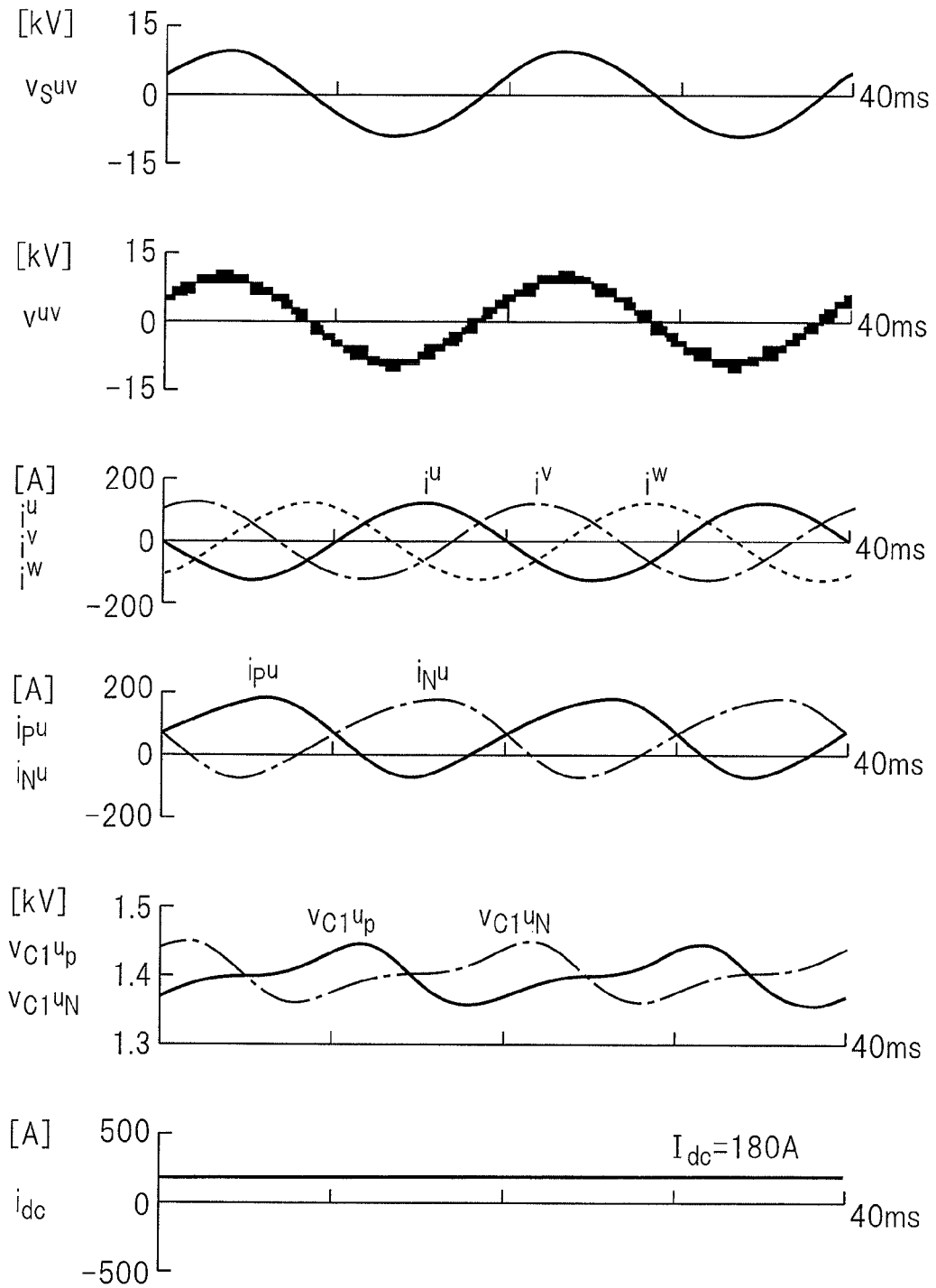
FIG. 19 is a diagram depicting simulated waveforms that have stationary characteristics when the three-phase power converter according to the seventh example performs an inverter operation.

FIG. 19 is a diagram depicting the simulated waveforms that have stationary characteristics when the three-phase power converter according to the seventh example depicted in FIG. 18 performs inverter operation. In the simulation, 'PSCAD®/EMTDC™' and the circuit parameters depicted in Table 1 are used in the same way as the simulations of the three-phase power converter according to the sixth example and the conventional three-phase modular multilevel cascade converter depicted in FIG. 16. As a simulation circuit, an analogue control system with zero control delay is assumed, and an ideal switch with zero dead time is used. The AC side of the three-phase power converter 2 depicted in FIG. 18 is connected to the three-phase AC power supply of 6.6 kV, 1 MVA, 50 Hz through the interconnection reactor $L_s$. The uppermost graph of FIG. 19 depicts a waveform of line voltage $v_{Suv}$ between the u and v phases of the three-phase AC power supply of 6.6 kV, 1 MVA, 50 Hz that is connected to the AC side of the three-phase power converter 2 through the interconnection reactor $L_s$. When the three-phase power converter 2 performs inverter operation (cos φ=−1), it can be seen that the waveforms of the three-phase power converter 2 according to the seventh example, depicted in the second to sixth graphs from the top in FIG. 19, are exactly the same as the waveforms, depicted in the second to sixth graphs from the top in FIG. 17, of the conventional three-phase modular multilevel cascade converter depicted in FIG. 16. Thus, it can be said that the three-phase power converter 2 according to the seventh example is a substitute circuit of the conventional three-phase modular multilevel cascade converter, since the three-phase power converter 2 has the same effects as the conventional three-phase modular multilevel cascade converter depicted in FIG. 16. Compared with the simulation result of the three-phase power converter according to the sixth example, it can be seen that the effective value $I_{dc}$ of the direct current $i_{dc}$ at the three-phase power converter of the seventh example (the sixth graph from the top in FIG. 19) is 180 A (=1 MW/5.6 kV), which is half the effective value $I_{dc}$ of the direct current $i_{dc}$ at the three-phase power converter according to the sixth example.

In the eighth example, a three-phase to two-phase power converter is configured by including two phases of the single-phase power converter 1 according to the first to fifth examples. A Scott transformer is used to interconnect the two phases of the single-phase power converter 1 according to the first to fifth examples to the system side.

Figure 20:
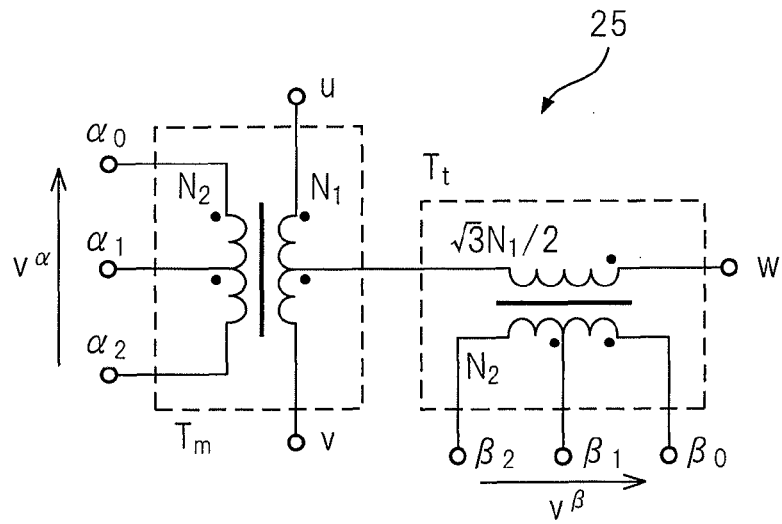
FIG. 20 is a circuit diagram depicting a Scott transformer used in the present invention.
Figure 21A:
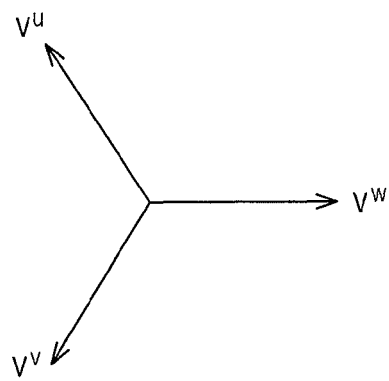
FIG. 21A is a diagram (Part 1) of instantaneous voltage vectors of the Scott transformer depicted in FIG. 20.
Figure 21B:
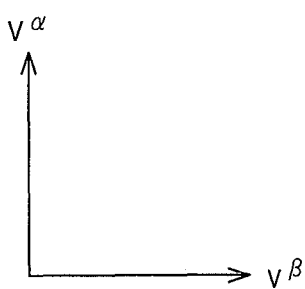
FIG. 21B is a diagram (Part 2) of instantaneous voltage vectors of the Scott transformer depicted in FIG. 20.

FIG. 20 is a circuit diagram depicting the Scott transformer used in the present invention. The Scott transformer 25 is configured by two units of single-phase transformers: a main phase transformer Tm; and a teaser transformer Tt. The winding number of the primary side winding of the main phase transformer Tm is defined as $N_1$, and the winding number of the secondary winding thereof is defined as $N_2$. The intermediate terminal (a center tap) of the primary side winding of the main phase transformer Tm is connected to the primary side winding of the teaser transformer Tt. It should be noted that the winding number of the primary side winding of the teaser transformer Tt becomes $\sqrt{3}N_1/2$. FIGS. 21A and 21B are diagrams of instantaneous voltage vectors of the Scott transformer depicted in FIG. 20. As depicted in FIG. 21A, when three-phase balanced sinusoidal voltages $v^u$, $v^v$, and $v^w$ are applied to the primary side winding of the Scott transformer, two-phase sinusoidal voltages $v^\alpha$ and $v^\beta$ that have a 90-degree phase difference therefrom appear on the secondary side winding.

Figure 22:
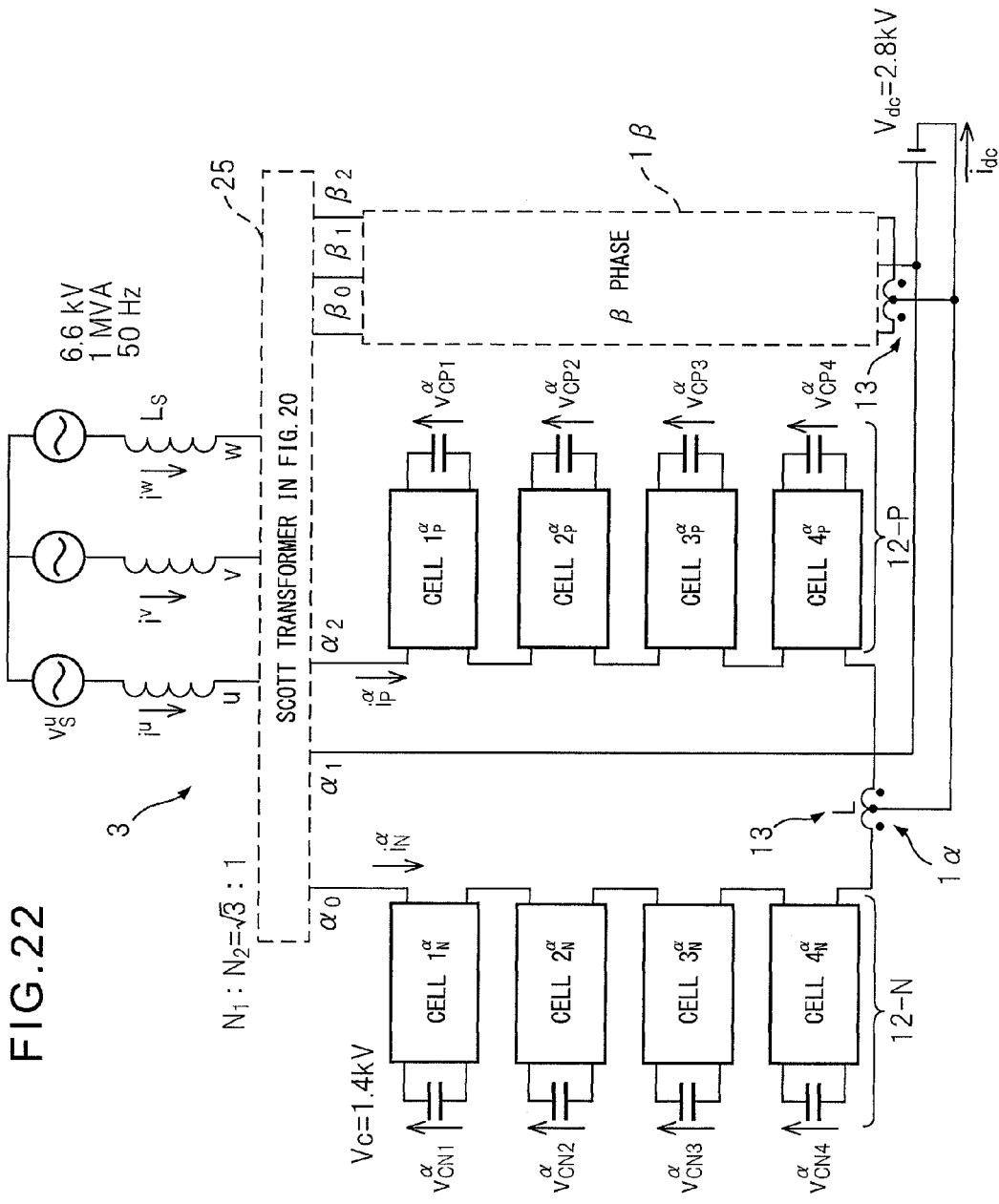
FIG. 22 is a circuit diagram depicting the three-phase to two-phase power converter according to the eighth example.

FIG. 22 is a circuit diagram depicting the three-phase to two-phase power converter according to the eighth example. While, in the eighth example depicted in FIG. 22, a case where the three-phase to two-phase power converter is configured using the single-phase power converter according to the first example is described as an example, the three-phase to two-phase power converter may also be configured in the same way using the single-phase power converter according to the second to fifth examples. In FIG. 22, the single-phase power converters provided in the α phase and β phase are indicated by reference signs 1α and 1β, and the three-phase to two-phase power converter configured by these single-phase power converters 1α and 1β is expressed by reference sign 3. It should be noted that, in the case of FIG. 22, since the circuit components of the single-phase power converter 1β are the same as those of the single-phase power converter 1β, specific descriptions of the circuit components are omitted. While the following will mainly describe the α phase, the same can be applied to the β phase. Further, while, in the eighth example, the number of unit cells is, but not limited to, four per arm, eight per phase, and therefore 16 in a three-phase power converter 2 as an example.

In the three-phase to two-phase power converter 3 according to the seventh aspect, each phase of the Scott transformer 25 is configured using the transformer 14 in the single-phase power converters 1α and 1β provided in the α phase and β phase. As an example, the winding number ratio of the primary side winding and the secondary side winding $N_1:N_2$ is defined as $\sqrt{3}:1$. In the α phase on the secondary side of the three-phase to two-phase power converter 3 according to the eighth example, an intermediate terminal (a center tap) $\alpha_1$ is provided on the secondary side winding of the main phase transformer Tm of the Scott transformer 25 as described with reference to FIG. 20. Further, in the β phase on the secondary side of the three-phase to two-phase power converter 3, an intermediate terminal (a center tap) $\beta_1$ is provided on the secondary side winding of the teaser phase transformer Tt of the Scott transformer 25 as described with reference to FIG. 20. As described with reference to FIG. 1, in the single-phase power converter 1, the third terminal c of the arm coupling unit 13 is connected to the anode-side terminal of the DC power supply $V_{dc}$, and the intermediate terminal T2-3 of the transformer 14 is connected to the cathode-side terminal of the DC power supply $V_{dc}$. In contrast, in the sixth example, these intermediate terminals $\alpha_1$ and $\beta_1$ are connected to the cathode side terminal of the DC power supply $V_{dc}$, thereby commonly using the DC power supply $V_{dc}$ between the α phase and β phase as depicted in FIG. 22.

Further, in the α phase of the secondary side of the three-phase to two-phase power converter 3, the terminals α0 and α1 of both ends of the secondary side winding of the main phase transformer Tm of the Scott transformer 25 are connected to the upper side terminals of the first arm 12-P and 12-N. The lower side terminals of the first arm 12-P and 12-N are connected to the three-terminal coupling reactor that is the arm coupling unit 13. The intermediate terminal of the three-terminal coupling reactor is connected to the anode side terminal of the DC power supply $V_{dc}$. The configuration of the β phase of the secondary side of the three-phase to two-phase power converter 3 is the same as the α phase.

Next, the response results of the instantaneous effective power control and instantaneous reactive power control in simulations of the three-phase to two-phase power converter 3 according to the eighth example will be described. The circuit parameters indicated in Table 1 are used in the simulations. The AC side of the three-phase to two-phase power converter 3 depicted in FIG. 22 is connected to the three-phase AC power supply of 6.6 kV, 1 MVA, 50 Hz through the interconnection reactor $L_s$. The power currents of the phases on the primary side of the three-phase to two-phase power converter 3 are defined as $i^u$, $i^v$, and $i^w$; the power voltages thereof are defined as $v^u_S$, $v^v_S$, and $v^w_S$; and the arm currents that flow in the first arms 12-P of the α phase and β phase on the secondary side of the three-phase to two-phase power converter 3 are respectively defined as $i^\alpha_P$ and $i^\beta_P$; and the arm currents that flow in the second arms 12-N thereof are defined as $i^\alpha_N$ and $i^\beta_N$. Further, the DC capacitor voltages of the unit cells are defined as $v^\alpha_{CPj}$ and $v^\alpha_{CNj}$ (where j=1 to 4), and the direct current is defined as $i_{dc}$.

According to FIGS. 20, 21A and 213, the voltage equations expressed by formulas 34 and 35 are derived.

[formula 34]

$$v_\alpha = \frac{N_2}{N_1}(v^u - v^v) \tag{34}$$

[formula 35]

$$v_\beta = \frac{\sqrt{3}N_2}{N_1}v^v \tag{35}$$

The arm currents $i^\alpha_P$ and $i^\alpha_N$ of the phase α of the three-phase to two-phase power converter 3 according to the eighth example include the DC component and the AC component of 50 Hz. Of the components, the DC components of the arm currents $i^\alpha{}_P$ and $i^\alpha{}_N$ can be expressed by $i_{dc}/4$. On the other hand, the AC components of the arm currents $i^\alpha{}_P$ and $i^\alpha{}_N$ are defined as $(i^\alpha{}_P)_{ac}$ and $(i^\alpha{}_N)_{ac}$. Then, formula 36 can be obtained from the relation of the magnetomotive force of the main phase transformer.

[formula 36]

$$\frac{N_1 i^u}{2} - \frac{N_1 i^v}{2} - \frac{N_2 (i^\alpha_N)_{ac}}{2} + \frac{N_2 (i^\alpha_P)_{ac}}{2} = 0 \tag{36}$$

If $(i^\alpha{}_P)_{ac} = -(i^\alpha{}_N)_{ac}$ is assumed in formula 36, formula 37 can be obtained.

[formula 37]

$$(i^\alpha_P)_{ac} = -(i^\alpha_N)_{ac} = -\frac{N_1}{2N_2}(i^u - i^v) \tag{37}$$

Likewise, for the β phase, from the relation of the magnetomotive force of the teaser transformer, formula 38 can be obtained.

[formula 38]

$$(i^\beta_P)_{ac} = -(i^\beta_N)_{ac} = -\frac{\sqrt{3} N_1}{2N_2} i^w \tag{38}$$

Thus, finally, the arm currents of the phases of the three-phase to two-phase power converter 3 can be expressed by formulas 39 to 42.

[formula 39]

$$i^\alpha_P = \frac{i_{dc}}{4} - \frac{N_1}{2N_2}(i^u - i^v) \tag{39}$$

[formula 40]

$$i^\alpha_N = \frac{i_{dc}}{4} + \frac{N_1}{2N_2}(i^u - i^v) \tag{40}$$

[formula 41]

$$i^\beta_P = \frac{i_{dc}}{4} - \frac{\sqrt{3} N_1}{2N_2} i^w \tag{41}$$

[formula 42]

$$i^\beta_P = \frac{i_{dc}}{4} + \frac{\sqrt{3} N_1}{2N_2} i^w \tag{42}$$

On the other hand, from formulas 39 to 42, the power currents of the phases $i^u$, $i^v$, and $i^w$ on the primary side of the three-phase to two-phase power converter 3 can be expressed by formulas 43 to 45, in which the relationship of $i^u + i^v + i^w = 0$ is used.

[formula 43]

$$i^u = \frac{N_2}{2N_1}\left\{i^\alpha_N - i^\alpha_P - \frac{1}{\sqrt{3}}(i^\beta_N - i^\beta_P)\right\} \tag{43}$$

[formula 44]

$$i^v = -\frac{N_2}{2N_1}\left\{i^\alpha_N - i^\alpha_P + \frac{1}{\sqrt{3}}(i^\beta_N - i^\beta_P)\right\} \tag{44}$$

[formula 45]

$$i^w = \frac{N_2}{\sqrt{3} N_1}(i^\beta_N - i^\beta_P) \tag{45}$$

Figure 23:
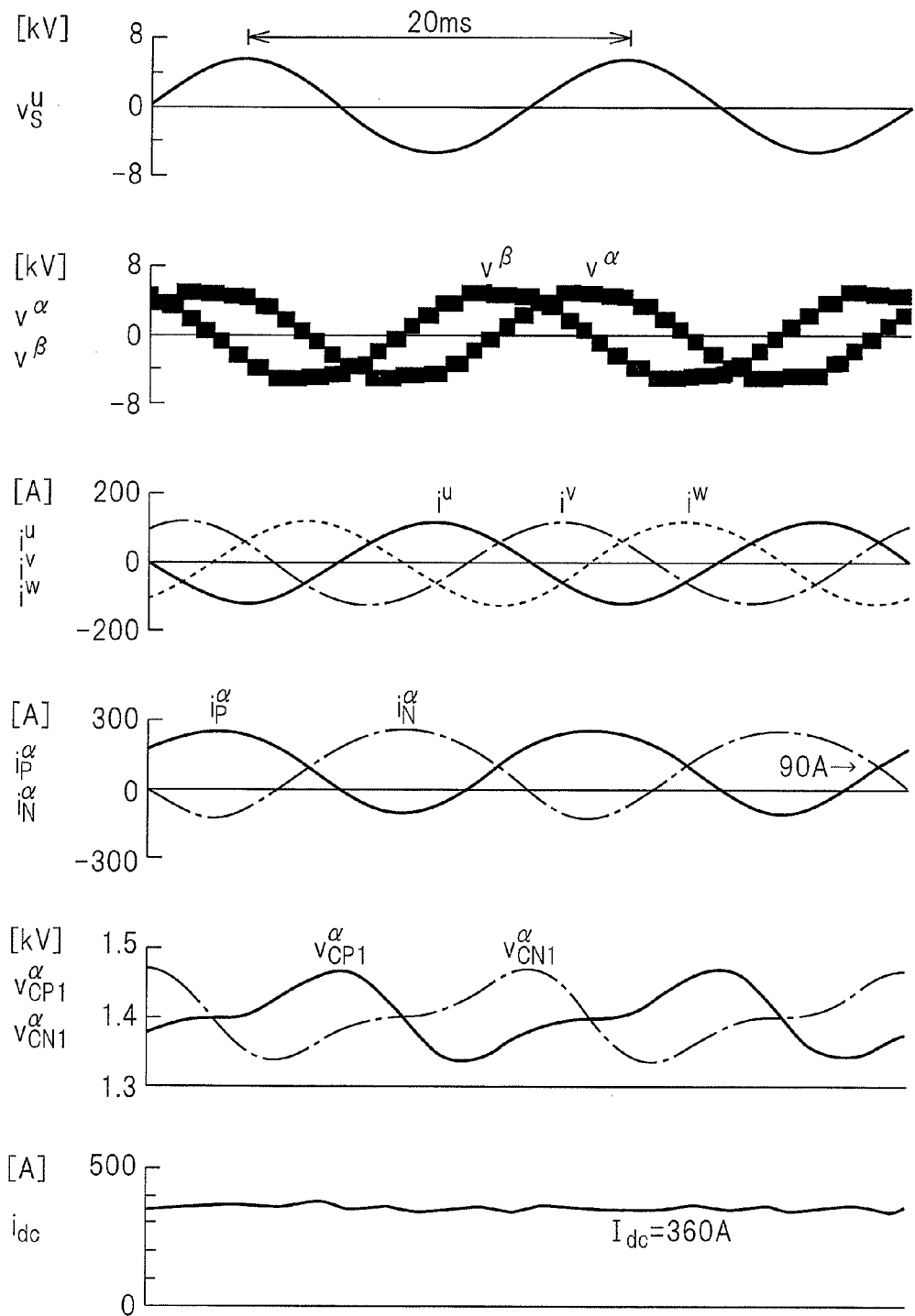
FIG. 23 is a diagram depicting simulated waveforms that have stationary characteristics when the three-phase to two-phase power converter according to the eighth example performs inverter operation.
Figure 24:
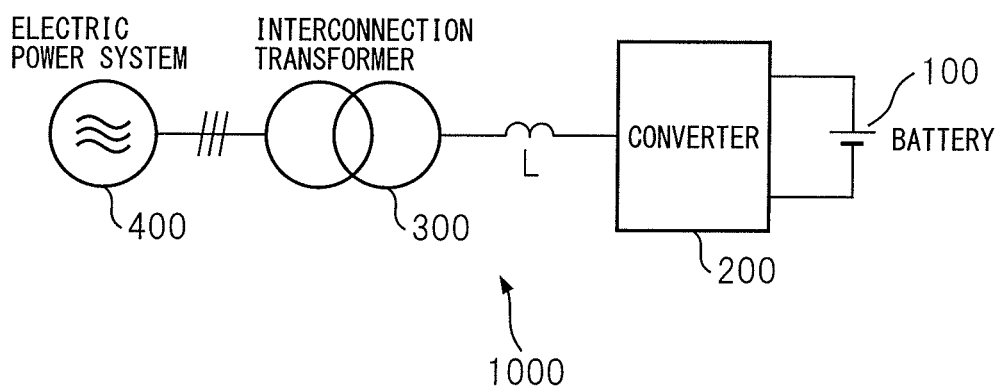
FIG. 24 is a diagram depicting a general configuration of a battery energy storage device.

FIG. 23 is a diagram depicting the simulated waveforms that have stationary characteristics when the three-phase to two-phase power converter according to the eighth example performs inverter operation. "PSCAD®/EMTDC™" is used for the simulation. As a simulation circuit, an analogue control system with zero control delay is assumed, and an ideal switch with zero dead time is used.

The uppermost graph in FIG. 23 depicts a waveform of the u phase voltage $v_s^u$ of the three-phase AC power supply of 6.6 kV, 1 MVA, 50 Hz that is connected to the AC side of the three-phase to two-phase power converter 3 through the interconnection reactor $L_s$. As depicted in the second graph from the top in FIG. 23, when the three-phase to two-phase power converter 3 performs inverter operation (cos φ=−1), if the influence from the harmonic voltages and the interconnection reactor is ignored, it can be seen that the phase of the voltage $v_\alpha$ of the α phase on the secondary side of the three-phase to two-phase power converter 3 is advanced by 30 degrees from that of the power voltage $v^u_s$. In contrast, it can be seen that the phase of the voltage $v_\alpha$ of the α phase on the secondary side of the three-phase to two-phase power converter 3 is advanced by 90 degrees from that of the voltage $v_\beta$ of the β phase on the secondary side. Since eight unit cells are provided for each phase, a multilevel waveform of nine levels is formed with little harmonic component.

While, as described above, the arm currents $i^\alpha{}_P$ and $i^\alpha{}_N$ of the α phase of the three-phase to two-phase power converter 3 include the DC component and the AC component of 50 Hz, the amplitudes of the arm currents $i^\alpha{}_P$ and $i^\alpha{}_N$ are $\sqrt{3}N_1/2N_2$ times larger than the amplitudes of the power currents $i^u$, $i^v$ and $i^w$ according to formulas 39 to 42. When $N_1/N_2 = \sqrt{3}$ is substituted, the amplitudes of the arm currents $i^\alpha{}_P$ and $i^\alpha{}_N$ become 1.5 times larger, which is the same as the simulation result of the third and fourth graphs from the top in FIG. 23. On the other hand, the DC component is 90 A, which is a quarter of the direct current $i_{dc}$. While the DC capacitor voltages $v^\alpha{}_{CP1}$ and $v^\alpha{}_{CN1}$ include the DC component and the AC component, it can be seen that the DC component is controlled to 1.4 kV. The DC component $I_{dc}$ of the direct current $i_{dc}$ can be calculated by $I_{dc} = P/V_{dc}$. When P=1 MW, $V_{dc}$=2.8 kV are substituted, $I_{dc}$=360 A can be obtained, which is the same as the simulation result indicated in the sixth graph from the top in FIG. 23.

INDUSTRIAL APPLICABILITY

The present invention can be applied to a single-phase power converter, a three-phase to two-phase power converter, and a three-phase power converter that bidirectionally convert DC and AC. Using the single-phase power converter, three-phase to two-phase power converter, and three-phase power converter according to the present invention, a battery energy storage device can be interconnected to an electric power system without using a converter transformer, and the device can be smaller and lighter. The converters of the present invention can be interconnected to the system with half the DC voltage compared with the conventional modular multilevel cascade converter, constructing an insulation structure on the DC side. Therefore, the present invention is most appropriate for use in a battery energy storage device that has low voltage and large current on the DC side.

REFERENCE SIGNS 1, 1u, 1v, 1w SINGLE-PHASE POWER CONVERTER
2 THREE-PHASE POWER CONVERTER
3 THREE-PHASE TO TWO-PHASE POWER CONVERTER
11-1, . . . , 11-M UNIT CELL
12-P FIRST ARM
12-N SECOND ARM
13 ARM COUPLING UNIT
14, 14' TRANSFORMER
15 THREE-TERMINAL COUPLING REACTOR
24 THREE-PHASE TRANSFORMER
25 SCOTT TRANSFORMER
50 DC CAPACITOR CONTROL DEVICE
51 COMMAND VALUE GENERATOR
52 CONTROLLER
61 DC COMPONENT GENERATOR
62 FUNDAMENTAL WAVE COMPONENT GENERATOR
63 SWITCHING CONTROLLER
A FIRST TERMINAL
B SECOND TERMINAL
C THIRD TERMINAL
D FREE WHEEL DIODE
S SEMICONDUCTOR SWITCHING ELEMENT
SW SEMICONDUCTOR SWITCH
T1-1, T1-2 AC INPUT AND OUTPUT TERMINAL
T2-1, T2-2 END TERMINAL OF SECONDARY SIDE WINDING
T2-3 INTERMEDIATE TERMINAL
$V_{dc}$ DC POWER SUPPLY

The invention claimed is:

1. A three-phase power converter that comprises three single-phase power converters for three phases, wherein the single-phase power converter comprising:
unit cells that each includes:
two semiconductor switches that are connected in series;
a direct current (DC) capacitor that is connected in parallel with the two semiconductor switches; and
input and output terminals of a current that is discharged from the DC capacitor or charged in the DC capacitor in response to switching operation of the semiconductor switches;
first and second arms that are each configured by one of the unit cells or a plurality of the unit cells that are cascade-connected to one another through the input and output terminals, the first and second arms comprising a same number of the unit cells;
an arm coupling unit that includes:
a first terminal to which an end of the first arm is connected;
a second terminal to which an end of the second arm is connected; and
a third terminal to which an end of a DC power supply is connected; and
a transformer that includes alternating current (AC) input and output terminals on a primary side and an intermediate terminal on a secondary side winding, wherein two end terminals of the secondary side winding are connected respectively to a terminal of an end of the first arm to which terminal the first terminal is not connected and a terminal of an end of the second arm to which terminal the second terminal is not connected, and the intermediate terminal is connected to a terminal of an end of the DC power supply to which terminal the third terminal is not connected, and
wherein the transformer in each of the single-phase power converter configures each phase of a three-phase transformer that includes a star connection on a primary side and an open star connection on a secondary side, and each of the single-phase power converter is commonly connected to the DC power supply.

2. The three-phase power converter according claim 1, wherein
the arm coupling unit is configured by a three-terminal coupling reactor that includes: the first terminal; the second terminal; and the third terminal that is an intermediate tap located on a winding between the first terminal and the second terminal.

3. The three-phase power converter according to claim 1, wherein
the arm coupling unit is configured by two reactors that are connected to each other in series, and the two reactors comprise: the first terminal that is a terminal of one of the serially-connected two reactors; the second terminal that is a terminal of the other one of the serially-connected two reactors; and the third terminal that is a series connection point of the serially-connected two reactors.

4. The three-phase converter according to claim 1, further comprising:
a reactor that is connected at an arbitrary position between the cascade-connected unit cells in each of the first arm and the second arm,
wherein the first terminal, the second terminal, and the third terminal are connected to one another at the arm coupling unit.

5. The three-phase power converter according to claim 1 comprising:
a command value generator that generates a circulating current command value based on a voltage value of the DC capacitor in the first arm and a voltage value of the DC capacitor in the second arm; and
a controller that controls power so that a circulating current that is half of the sum of a current that flows the first arm and a current that flows the second arm follows the circulating current command value.

6. The three-phase power converter according to claim 5, wherein the command value generator generates the circulating current command value for controlling power so that a value obtained by averaging voltage values of all the DC capacitors in the first arm and the second arm follows a predetermined DC voltage command value using the value obtained by averaging the voltage values of all the DC capacitors in the first arm and the second arm.

7. The three-phase power converter according to claim 5, wherein the command value generator includes:
a fundamental wave component generator that generates a fundamental wave component of the circulating current command value that is a same phase as a terminal voltage between the AC input and output terminals, using a difference between a value obtained by averaging all the voltage values of the DC capacitors in the first arm and a value obtained by averaging all the voltage values of the DC capacitors in the second arm; and a DC component generator that generates a DC component of the circulating current command value for controlling power so that a value obtained by averaging voltage values of all the DC capacitors in the first arm and the second arm follows a predetermined DC voltage command value using the value obtained by averaging the voltage values of all the DC capacitors in the first arm and the second arm, and the command value generator generates the circulating current command value by adding the fundamental wave component and the DC component.

8. The three-phase power converter according to claim 7, wherein the fundamental wave component is a value for controlling to nullify a difference between a value obtained by averaging all the voltage values of the DC capacitors in the first arm and a value obtained by averaging all the voltage values of the DC capacitors in the second arm.

9. The three-phase power converter according to claim 5, wherein the controller further performs a follow control so that a voltage value of each of the DC capacitors in the first arm follows the value obtained by averaging voltage values of all the DC capacitors in the first arm, as well as, performs a follow control so that a voltage value of each of the DC capacitors in the second arm follows the value obtained by averaging voltage values of all the DC capacitors in the second arm.

10. The three-phase power converter according to claim 9, wherein the controller comprises a switching commander that causes the semiconductor switches to perform switching operation in accordance with the follow control.

11. A three-phase power converter that comprises three single-phase power converters for three phases, wherein the single-phase power converter comprising:

unit cells that each includes:

two semiconductor switches that are connected in series;

a DC capacitor that is connected in parallel with the two semiconductor switches; and input and output terminals of a current that is discharged from the DC capacitor or charged in the DC capacitor in response to switching operation of the semiconductor switches;

first and second arms that are each configured by one of the unit cells or a plurality of the unit cells that are cascade-connected to one another through the input and output terminals, the first and second arms comprising a same number of the unit cells;

an arm coupling unit that includes:

a first terminal between which and one end of the first arm a DC power supply is connected;

a second terminal between which and one end of the second arm another DC power supply is connected; and a third terminal that is connected to the first terminal and the second terminal;

a transformer that includes AC input and output terminals on a primary side and a three-terminal coupling reactor on a secondary side winding, wherein two end terminals of the secondary side winding are respectively connected to a terminal of an end of the first arm to which terminal the DC power supply is not connected and a terminal of an end of the second arm to which terminal the other DC power supply is not connected, and an intermediate terminal that is located on a winding between terminals of both ends of the three-terminal coupling reactor is connected to the third terminal, and wherein the transformer in each of the single-phase power converter configures each phase of a three-phase transformer that includes a star connection on a primary side and an open star connection on a secondary side, and each of the single-phase power converter is commonly connected to the DC power supply.

12. A three-phase power converter that comprises three single-phase power converters for three phases, wherein the single-phase power converter comprising:

unit cells that each includes:

two semiconductor switches that are connected in series;

a DC capacitor that is connected in parallel with the two semiconductor switches; and input and output terminals of a current that is discharged from the DC capacitor or charged in the DC capacitor in response to switching operation of the semiconductor switches;

first and second arms that are each configured by one of the unit cells or a plurality of the unit cells that are cascade-connected to one another through the input and output terminals, the first and second arms comprising a same number of the unit cell, a DC power supply being connected between one end of the first arm and the second arm;

a first capacitor that is connected to a terminal of one end of the first arm to which terminal the DC power supply is connected;

a second capacitor that is connected to a terminal of one end of the second arm to which terminal the DC power supply is connected;

an arm coupling unit that includes:

a first terminal to which is connected a terminal of one end of the first capacitor to which terminal the first arm is not connected;

a second terminal to which is connected a terminal of one end of the second capacitor to which terminal the second arm is not connected; and a third terminal that is connected to the first terminal and the second terminal; and a transformer that includes AC input and output terminals on a primary side and a three-terminal coupling reactor on a secondary side winding, wherein two end terminals of the secondary side winding are connected respectively to a terminal of an end of the first arm to which terminal the first capacitor is not connected and a terminal of an end of the second arm to which terminal the second capacitor is not connected, and an intermediate terminal that is located on a winding between terminals of both ends of the three-terminal coupling reactor is connected to the third terminal, and wherein the transformer in each of the single-phase power converter configures each phase of a three-phase transformer that includes a star connection on a primary side and an open star connection on a secondary side, and each of the single-phase power converter is commonly connected to the DC power supply.

13. A three-phase to two-phase power converter that comprises two single-phase power converters for two phases, wherein the single-phase power converter comprising:

unit cells that each includes:
two semiconductor switches that are connected in series;
a direct current (DC) capacitor that is connected in parallel with the two semiconductor switches; and
input and output terminals of a current that is discharged from the DC capacitor or charged in the DC capacitor in response to switching operation of the semiconductor switches;
first and second arms that are each configured by one of the unit cells or a plurality of the unit cells that are cascade-connected to one another through the input and output terminals, the first and second arms comprising a same number of the unit cells;
an arm coupling unit that includes:
a first terminal to which an end of the first arm is connected;
a second terminal to which an end of the second arm is connected; and
a third terminal to which an end of a DC power supply is connected; and
a transformer that includes alternating current (AC) input and output terminals on a primary side and an intermediate terminal on a secondary side winding, wherein two end terminals of the secondary side winding are connected respectively to a terminal of an end of the first arm to which terminal the first terminal is not connected and a terminal of an end of the second arm to which terminal the second terminal is not connected, and the intermediate terminal is connected to a terminal of an end of the DC power supply to which terminal the third terminal is not connected, and
wherein a secondary side winding of the transformer in each of the single-phase power converter configures a winding of each phase on a secondary side of a Scott transformer, and
each of the single-phase power converter is commonly connected to the DC power supply.

14. The three-phase to two-phase power converter according claim 13, wherein
the arm coupling unit is configured by a three-terminal coupling reactor that includes: the first terminal; the second terminal; and the third terminal that is an intermediate tap located on a winding between the first terminal and the second terminal.

15. The three-phase to two-phase power converter according to claim 13, wherein
the arm coupling unit is configured by two reactors that are connected to each other in series, and the two reactors comprise: the first terminal that is a terminal of one of the serially-connected two reactors; the second terminal that is a terminal of the other one of the serially-connected two reactors; and the third terminal that is a series connection point of the serially-connected two reactors.

16. The three-phase to two-phase converter according to claim 13, further comprising:
a reactor that is connected at an arbitrary position between the cascade-connected unit cells in each of the first arm and the second arm,
wherein the first terminal, the second terminal, and the third terminal are connected to one another at the arm coupling unit.

17. A three-phase to two-phase power converter that comprises two single-phase power converters for two phases, wherein the single-phase power converter comprising:

unit cells that each includes:
two semiconductor switches that are connected in series;
a DC capacitor that is connected in parallel with the two semiconductor switches; and
input and output terminals of a current that is discharged from the DC capacitor or charged in the DC capacitor in response to switching operation of the semiconductor switches;
first and second arms that are each configured by one of the unit cells or a plurality of the unit cells that are cascade-connected to one another through the input and output terminals, the first and second arms comprising a same number of the unit cells;
an arm coupling unit that includes:
a first terminal between which and one end of the first arm a DC power supply is connected;
a second terminal between which and one end of the second arm another DC power supply is connected; and
a third terminal that is connected to the first terminal and the second terminal;
a transformer that includes AC input and output terminals on a primary side and a three-terminal coupling reactor on a secondary side winding, wherein two end terminals of the secondary side winding are respectively connected to a terminal of an end of the first arm to which terminal the DC power supply is not connected and a terminal of an end of the second arm to which terminal the other DC power supply is not connected, and an intermediate terminal that is located on a winding between terminals of both ends of the three-terminal coupling reactor is connected to the third terminal, and
wherein a secondary side winding of the transformer in each of the single-phase power converter configures a winding of each phase on a secondary side of a Scott transformer, and
each of the single-phase power converter is commonly connected to the DC power supply.

18. A three-phase to two-phase power converter that comprises two single-phase power converters for two phases, wherein the single-phase power converter comprising:
unit cells that each includes:
two semiconductor switches that are connected in series;
a DC capacitor that is connected in parallel with the two semiconductor switches; and
input and output terminals of a current that is discharged from the DC capacitor or charged in the DC capacitor in response to switching operation of the semiconductor switches;
first and second arms that are each configured by one of the unit cells or a plurality of the unit cells that are cascade-connected to one another through the input and output terminals, the first and second arms comprising a same number of the unit cell, a DC power supply being connected between one end of the first arm and the second arm;
a first capacitor that is connected to a terminal of one end of the first arm to which terminal the DC power supply is connected;
a second capacitor that is connected to a terminal of one end of the second arm to which terminal the DC power supply is connected;
an arm coupling unit that includes:
a first terminal to which is connected a terminal of one end of the first capacitor to which terminal the first arm is not connected;

a second terminal to which is connected a terminal of one end of the second capacitor to which terminal the second arm is not connected; and a third terminal that is connected to the first terminal and the second terminal; and a transformer that includes AC input and output terminals on a primary side and a three-terminal coupling reactor on a secondary side winding, wherein two end terminals of the secondary side winding are connected respectively to a terminal of an end of the first arm to which terminal the first capacitor is not connected and a terminal of an end of the second arm to which terminal the second capacitor is not connected, and an intermediate terminal that is located on a winding between terminals of both ends of the three-terminal coupling reactor is connected to the third terminal, and wherein a secondary side winding of the transformer in each of the single-phase power converter configures a winding of each phase on a secondary side of a Scott transformer, and each of the single-phase power converter is commonly connected to the DC power supply.

* * * * *